(12) United States Patent
Hofmeister

(10) Patent No.: US 10,695,961 B2
(45) Date of Patent: Jun. 30, 2020

(54) METHOD FOR MODIFYING THE WETTABILITY OF SURFACES

(71) Applicant: Ultra Small Fibers, LLC, Wartrace, TN (US)

(72) Inventor: William Hudson Hofmeister, Nashville, TN (US)

(73) Assignee: Ultra Small Fibers, LLC, Wartrace, TN (US)

(*) Notice: Subject to any disclaimer, the term of this patent is extended or adjusted under 35 U.S.C. 154(b) by 0 days.

(21) Appl. No.: 16/526,287

(22) Filed: Jul. 30, 2019

(65) Prior Publication Data

US 2020/0039122 A1 Feb. 6, 2020

Related U.S. Application Data

(60) Provisional application No. 62/713,057, filed on Aug. 1, 2018.

(51) Int. Cl.

| | | |
|---|---|---|
| *B29C 41/26* | (2006.01) | |
| *C08J 5/18* | (2006.01) | |
| *B29C 41/40* | (2006.01) | |
| *B01D 15/10* | (2006.01) | |
| *C02F 1/28* | (2006.01) | |
| *B29L 7/00* | (2006.01) | |
| *B01D 53/26* | (2006.01) | |
| *C02F 101/32* | (2006.01) | |

(52) U.S. Cl.
CPC ............ *B29C 41/26* (2013.01); *B29C 41/40* (2013.01); *C08J 5/18* (2013.01); *B01D 15/10* (2013.01); *B01D 53/261* (2013.01); *B29L 2007/008* (2013.01); *C02F 1/28* (2013.01); *C02F 2101/32* (2013.01)

(58) Field of Classification Search
None
See application file for complete search history.

(56) References Cited

U.S. PATENT DOCUMENTS

| 9,069,244 B2 * | 6/2015 | Kobrin ..................... G03F 1/00 |
| 2013/0216779 A1 | 8/2013 | Hofmeister et al. |
| 2015/0367380 A1 * | 12/2015 | Kotov .................... B42D 25/45 |
| | | 356/71 |

(Continued)

OTHER PUBLICATIONS

Burton et al. (Nano Letters, 2005, 5, 1607-1613). (Year: 2005).*

(Continued)

*Primary Examiner* — Clare M Perrin
(74) *Attorney, Agent, or Firm* — Eric B Fugett; Mark A. Pitchford; Pitchford Fugett, PLLC

(57) ABSTRACT

A method for modifying the wettability of a surface of an object can comprise forming on the surface of the object one or more arrays of nanofibers, wherein the one or more arrays of nanofibers includes nanofibers spaced along an X-axis and a Y-axis at the same or different intervals along either axis, the one or more arrays of nanofibers is integral with the object, and the nanofibers all have a base portion that is substantially normal to the surface. The intervals, diameter, and length of the nanofibers of the one or more arrays of nanofibers are selected so that the wettability of the surface for one or more predetermined liquids is increased or decreased relative to the wettability of the surface in the absence of the array of nanofibers.

4 Claims, 27 Drawing Sheets

(56) References Cited

U.S. PATENT DOCUMENTS

2016/0222345 A1    8/2016  Hofmeister et al.
2017/0072349 A1    3/2017  Hofmeister et al.
2017/0320057 A1   11/2017  Hofmeister et al.

OTHER PUBLICATIONS

White et al., "Single-pulse ultrafast-laser machining of high aspect nanoholes at the surface of SiO2," Optics Express, vol. 16, No. 19, p. 14411-14420 (2008).

* cited by examiner

| Silica Mould ID | Spacing X axis (μm) | Pore spacing Y axis (μm) | Fibers per area (100 μm²) | Laser Energy per pulse (μJ) | KOH etch time, molarity (hours, moles) | Fibre width mean ± SEM (μm) | Fibre height mean ± SEM (μm) |
|---|---|---|---|---|---|---|---|
| 2 × 2 | 2 | 2 | 25 | 1.4 | 1, 10M | 0.15 ± 0.03 | 30.00 ± 5.00 |
| 2 × 3 | 2 | 3 | 16.7 | 2 | 1, 10M | 0.29 ± 0.05 | 25.00 ± 10.00 |
| 4 × 4 | 4 | 4 | 6.2 | 2 | 1, 10M | 0.27 ± 0.05 | 30.00 ± 5.00 |
| 5 × 5 | 5 | 5 | 4 | 4 | 3, 5M | 0.46 ± 0.05 | 30.00 ± 5.00 |
| 7 × 7 | 7 | 7 | 2 | 1.8 | 2, 10M | 1.10 ± 0.08 | 24.56 ± 0.45 |
| 8 × 8 | 8 | 8 | 1.5 | 1.8 | 2, 10M | 0.91 ± 0.07 | 15.65 ± 0.28 |
| 10 × 10 | 10 | 10 | 1 | 2 | 2, 10M | 0.92 ± 0.07 | 23.75 ± 0.96 |

Figure 10

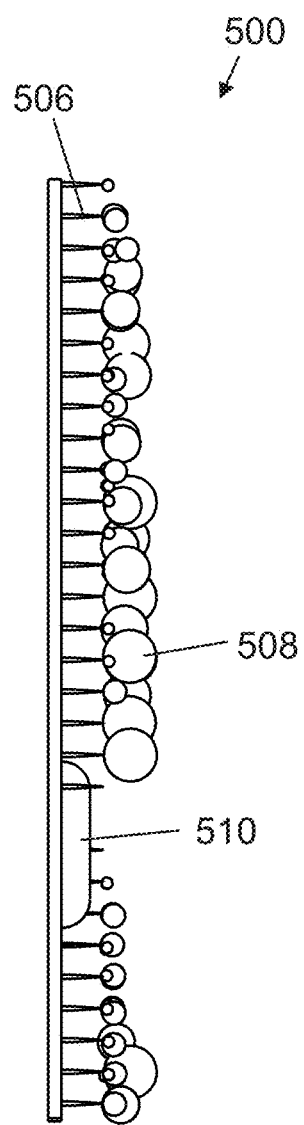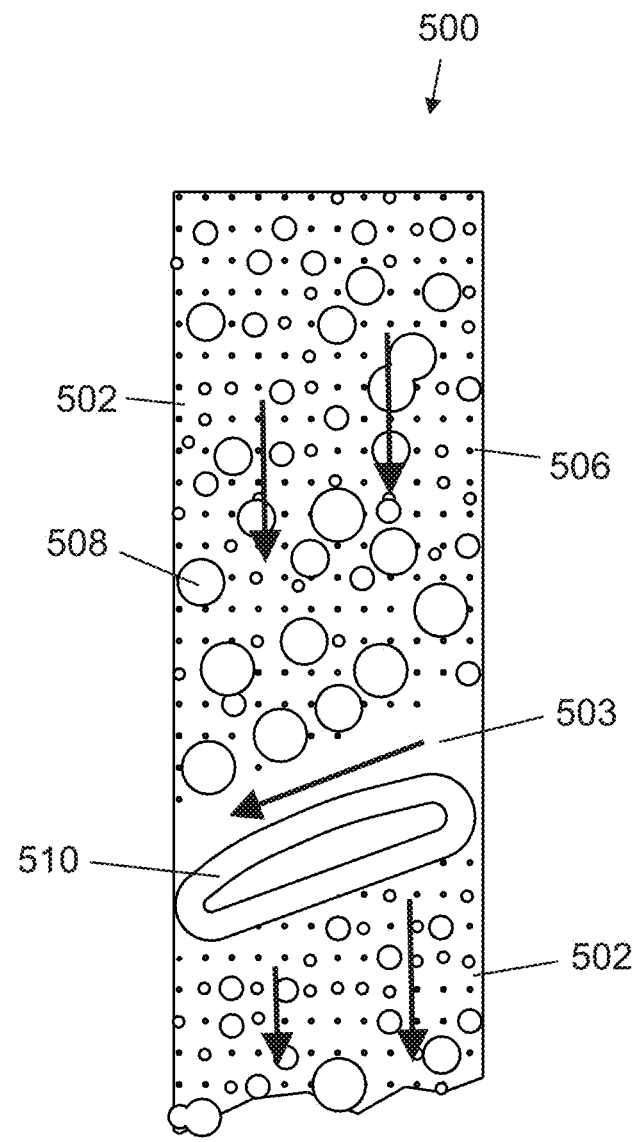
Fig. 19
Fig. 20

METHOD FOR MODIFYING THE WETTABILITY OF SURFACES

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Wetting is the ability of a liquid to maintain contact with a solid surface. Liquid that wets a surface spreads out over that surface. Liquid that does not wet a surface will minimize contact with that surface and become a more spherical droplet.

Surface roughness affects the wetting behavior. If surfaces are "non-wetting" then surface roughness tends to make the surface less wetting and more non-wetting. If the surface is "wetting" then roughness tends to make it more wetting.

Chemical treatments are used on surfaces to change wetting properties. Rain-X® is an example of a hydrophobic surface treatment consisting of polymer molecules that stick to glass and repel water. A small amount of Rain-X® by 3M Corporation (St. Paul, Minn.) applied to a windshield facilitates the "de-wetting" of the windshield by causing water to "ball-up" due to the large contact angle between water and a Rain-X® coated surface. Chemical treatments are used as sizing and coating for paper and fabric—woven and non-woven to control the way these materials interact with fluids from diapers to ink jet printer paper. Scotchgard®, also by 3M Corporation, creates a hydrophobic surface on fabrics. Modifying the wettability of surfaces chemically is well-known and widely practiced.

Recent advances in nanotechnology, particularly biomimicry, have renewed interest in how structure can modify surface properties. From the self-cleaning surface of plants, coined the "Lotus Leaf Effect," to propulsion in water walking insects; nature uses chemistry AND structure to control interaction with fluids. "Biomimetic modification of surface properties," had over 100,000 hits on Google Scholar in January, 2016.

Studies have shown that nanofibers have an ability to form structures that to a degree mimic those present in nature. The unique properties of the nanofibers allow the creation of fibers that are superhydrophobic or superhydrophilic, essentially enhancing the properties of the bulk material. Nanofibers for prior art surface wettability modification are commonly made by electrospinning, a method that requires the use of high voltages and a flowing polymer solution containing solvents that evaporate during production. Ensor, et al. in U.S. Pat. No. 8,652,229 describe methods for electrospinning nanofibers for forming filter elements. In the methods described, the electrospinning process requires electrical potentials in the 25 kV to 30 kV range and the close control of several process parameters. The rates of nanofiber production are low in the examples given. It is not an environmentally friendly process due to the solvents required and is not easily scalable to produce the large quantities required for commercial products, particularly consumer products.

Nanofibers produced by electrospinning are long and continuous with few fiber ends created. The orientation is random and the fibers are not bonded to an underlying surface. This is in contrast to nanofibers occurring in nature that are generally highly ordered, are integral with an underlying surface, and have an abundance of fiber ends.

BRIEF SUMMARY

The presently disclosed subject matter overcomes some or all of the above-identified deficiencies of the prior art, as will become evident to those of ordinary skill in the art after a study of the information provided in this document.

In a first aspect the present invention provides a method for affecting the wettability of a surface through the formation thereon of ordered arrays of nanofibers, the nanofibers being integral with the surface. Nanofibers in these ordered arrays have a predetermined spacing, diameter, length and are substantially normal to the surface at their base. The nanofibers have a high aspect ratio, that is, the length (also referred to as "height" herein) is a multiple of the diameter of the fiber. In contrast to electrospun nanofibers, the orientation of the fibers in these arrays is controlled, and the length of these nanofibers is orders of magnitude shorter than that of electrospun fibers. Nanofibers of the present invention are affixed to a surface at one end and at the other free end provide sites for interaction with liquids so as to increase or decrease the wettability of the surface. As such, nanofiber arrays of the present invention formed on surfaces more closely mimic those occurring in nature than prior art nanostructures formed by electrospinning, and are also much more effective in determining wetting behavior of a surface.

The wetting behavior of a surface of the present invention on which high aspect ratio nanofibers are formed is strongly affected by the structural characteristics of the nanofiber arrays formed on that surface. If the wetting behavior of a surface is plotted as a function of the spacing of nanofibers forming arrays thereon, within a certain narrow range of spacing the wettability of a first liquid on that surface are significantly increased compared to nanofiber spacings less than or greater than those within the narrow range. Similarly, for a second liquid that is marginally non-wetting on the surface, within a narrow range of spacings between the array nanofibers the non-wetting behavior of the second liquid is significantly enhanced. In a preferred embodiment of the present invention, the first liquid is oil and the second liquid is water. There is overlap in the range of nanofiber spacings for which the wetting of oil and non-wetting behavior of water is enhanced. Polymeric materials with nanofiber arrays having spacing within the specified range of overlap may be used to more effectively separate oil from water, the water being non-wetting on the material and the oil being wetting by increasing the differential between wetting and non-wetting of the conventionally prepared materials.

In a second aspect, the present invention provides methods for forming nanofiber arrays on the surface of a polymeric film, the method requiring neither solvents nor high voltage. As such, it is much more environmentally friendly than the electrospinning method now in common use. While the electrospinning method is slow and not well suited to scale-up to an industrial level, methods taught herein are scalable and allow the rapid production of polymeric film with high aspect ratio nanostructures formed thereon Numerous other objects, advantages and features of the present disclosure will be readily apparent to those of skill in the art upon a review of the following drawings and description of exemplary embodiments.

BRIEF DESCRIPTION OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

FIG. 10 is a table giving dimensional information on the nanoscale textures used to create the plot of FIG. 9.

FIG. 19 is an expanded sectional view of a portion of the moisture collector of FIG. 16 depicting liquid droplets forming on a non-wetting surface portion and flowing on a wetting surface portion.

FIG. 20 is a side elevational view of the portion of FIG. 19.

DETAILED DESCRIPTION

Figure 1A:
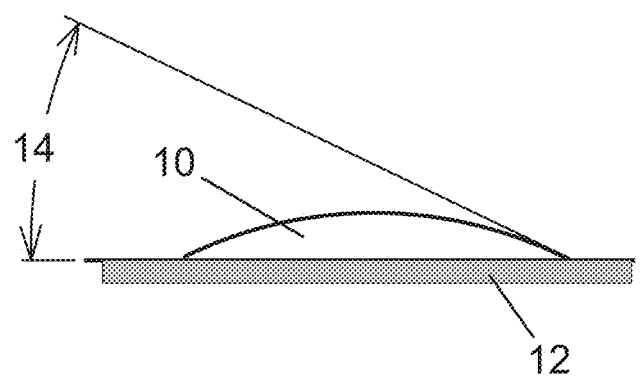
FIG. 1A depicts a fluid droplet on a surface wherein the fluid wets the surface.
Figure 1B:
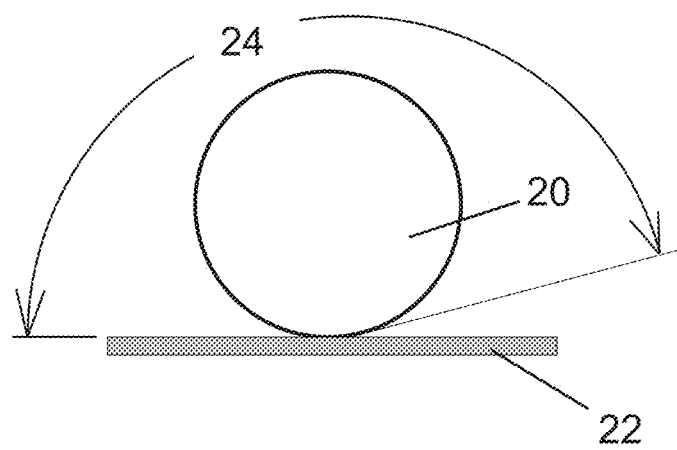
FIG. 1B depicts a fluid droplet on a surface wherein the fluid is nonwetting.

The details of one or more embodiments of the presently disclosed subject matter are set forth in this document. Modifications to embodiments described in this document, and other embodiments, will be evident to those of ordinary skill in the art after a study of the information provided herein. The information provided in this document, and particularly the specific details of the described exemplary embodiments, is provided primarily for clearness of understanding and no unnecessary limitations are to be understood therefrom. In case of conflict, the specification of this document, including definitions, will control.

The present disclosure relates to the modification of the wetting behavior of surfaces. In a general embodiment, the nanofibers disclosed herein are designed to enhance the wetting or non-wetting behavior of a surface of a polymeric body using one or more user-defined arrays of nanofibers, such as those described in U.S. 2013/0216779 which is incorporated herein by reference in its entirety.

While the terms used herein are believed to be well understood by one of ordinary skill in the art, definitions are set forth herein to facilitate explanation of the subject matter disclosed herein.

Unless defined otherwise, all technical and scientific terms used herein have the same meaning as commonly understood by one of ordinary skill in the art to which the subject matter disclosed herein belongs. Although any methods, devices, and materials similar or equivalent to those described herein can be used in the practice or testing of the presently disclosed subject matter, representative methods, devices and materials are now described.

The terms "a", "an", and "the" refer to "one or more" when used in this application, including the claims. Thus, for example, reference to "a contaminant" includes a plurality of particles of the contaminant, and so forth. The use of the word "a" or "an" when used in conjunction with the term "comprising" in the claims and/or the specification may mean "one," but it is also consistent with the meaning of "one or more," "at least one," and "one or more than one."

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage or a physical dimension such as length, width, or diameter, is meant to encompass variations of in some embodiments +/−20%, in some embodiments +/−10%, in some embodiments +/−5%, in some embodiments +/−1%, in some embodiments +/−0.5%, and in some embodiments +/−0.1% from the specified value or amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "nanofiber" refers to a fiber structure integral with an underlying surface and having a diameter of less than 1000 nanometers for more than half the length of the structure. In some embodiments, the nanofibers disclosed herein can comprise a tapered base portion and a relatively longer fiber portion which extends from the base portion. In such embodiments, the fiber portion has a diameter of less than 1000 nm and a length greater than that of the base portion, and the base portion can have a diameter of from about 10 micron to less than 1.0 micron. Additionally, in some embodiments, the base portion can also have a length of from about 1.0 micron to about 10 microns, and the fiber portion can have a length of from about 10 to 100 times greater than the length of the base portion. Nanofibers having larger diameter base portions in the range of from about 2.0 microns to about 10 microns are best suited for applications wherein the bases must provide stiffness to the nanofiber.

In some preferred embodiments, nanofibers suitable for use in modifying the surface wettability of surfaces of devices disclosed herein can have an overall length of from about 10 to about 100 microns. Accordingly, suitable nanofibers can also have a length to diameter ratio (also referred herein as an "aspect ratio") of from 10:1 to about 1000:1. In one embodiment, the length to diameter ratio is from about 10:1 to about 100:1. By contrast, nanofibers known in the art, including electrospun nanofibers, melt-blown nanofibers and microfiber-derived nanofibers (i.e., microfibers split during processing to obtain sub-micron diameter structures), typically have much greater length to diameter ratios in the range of 1,000,000:1 to 100,000,000:1. As a result, the nanofibers used to affect the wettability of surfaces of devices disclosed herein can have from about 10 to about 1000 times more tips per unit length than electrospun nanofibers, melt blown nanofibers and microfiber derived nanofibers.

The related terms "nanofiber array" and "array of nanofibers," which are used interchangeably herein, collectively refer to a plurality of freestanding nanofibers of user-defined physical dimensions and composition integrally formed on and extending from a backing member, such as a film, according to user-defined spatial parameters. In some embodiments, the nanofiber arrays disclosed herein include nanofibers that extend from a surface of the backing member at an angle substantially normal to a plane containing the surface of the backing member from which the nanofibers extend. By contrast, electrospun nanofibers, melt-blown nanofibers, and microfiber-derived nanofibers are neither integrally formed on nor do they extend from a backing member.

User optimizable physical characteristics of the nanofiber arrays disclosed herein include fiber spacing, diameter (also sometimes referred to herein as "width"), height (also sometimes referred to herein as "length"), number of fibers per unit of backing member surface area (also referred to herein as "fiber surface area density"), fiber composition, fiber surface texture, and fiber denier. For example, nanofiber arrays used to modify the surface wetting characteristics of devices disclosed herein can comprise millions of nanofibers per square centimeter of backing member, with fiber diameter, length, spacing, composition, and texture configured to perform a function. For example, the characteristics of the nanofiber arrays may create surfaces that are wetted by a first liquid and not wetted by a second liquid such that a barrier may be created that is permeable by the first liquid and presents a barrier to the second liquid. In some embodiments, one or more of fiber surface area density, diameter, length, spacing, composition, and texture are controlled and optimized to perform a filtration function.

The nanofiber arrays disclosed herein, when formed on a substantially planar surface of a backing member, can include nanofibers spaced along an X-axis and a Y-axis at the same or different intervals along either axis. In some embodiments, the nanofibers can be spaced from about 100 nm to 200 micron or more apart on the X-axis and, or alternatively, the Y-axis. In certain embodiments, the nanofibers can be spaced from about 1 micron to about 50 micron apart on one or both of the X-axis and the Y-axis. In a preferred embodiment, the nanofibers can be spaced from about 2 micron to about 7 micron apart on one or both of the X-axis and the Y-axis.

In some embodiments, an array of nanofibers can include nanofibers having an average length of at least 25 micron. In certain embodiments, the nanofibers can have a length of from about 10 micron to about 100 micron. In certain embodiments, the nanofibers can have a length of from about 15 micron to about 60 micron. In an exemplar embodiment, the nanofibers can have an average length of from about 20 micron to about 30 micron. In specific embodiments, the nanofibers can have a length of about 15.00 micron, 16.00 micron, 17.00 micron, 18.00 micron, 19.00 micron, 20.00 micron, 21.00 micron, 22.00 micron, 23.00 micron, 24.00 micron, 25.00 micron, 26.00 micron, 27.00 micron, 28.00 micron, 29.00 micron, 30.00 micron, 31.00 micron, 32.00 micron, 33.00 micron, 34.00 micron, 35.00 micron, 36.00 micron, 37.00 micron, 38.00 micron, 39.00 micron, 40.00 micron, 41.00 micron, 42.00 micron, 43.00 micron, 44.00 micron, 45.00 micron, 46.00 micron, 47.00 micron, 48.00 micron, 49.00 micron, 50.00 micron, 51.00 micron, 52.00 micron, 53.00 micron, 54.00 micron, 55.00 micron, 56.00 micron, 57.00 micron, 58.00 micron, 59.00 micron, or 60.00 micron.

The nanofiber backing member surface area density can range from about 25,000,000 to about 100,000 nanofibers per square centimeter. In some embodiments, the nanofiber surface area density can range from about 25,000,000 to about 2,000,000 nanofibers per square centimeter. In specific embodiments, the nanofiber surface density is about 6,000,000 nanofibers per square centimeter. In an exemplar embodiment, the nanofiber surface area density is about 2,000,000 nanofibers per square centimeter.

In some embodiments, an array of nanofibers can include nanofibers having an average denier of from about 0.001 denier to less than 1.0 denier. In an exemplar embodiment, the nanofibers forming a nanofiber array disclosed herein can be less than one denier and have a diameter ranging from about 50 nm to about 1000 nm.

Nanofiber arrays and methods for producing nanofiber arrays on surfaces suitable for modifying the wetting characteristics of a surface as disclosed herein are described by the present inventors in U.S. 2013/0216779, U.S. 2016/0222345, and White et al., Single-pulse ultrafast-laser machining of high aspect nanoholes at the surface of SiO2, Opt. Express. 16:14411-20 (2008), each of which is incorporated herein by reference in its entirety.

A preferred method for manufacturing herein described ribbons and ribbon segments of the present invention with optimized surface wetting characteristics is hot pressing, a method in which a suitable polymeric film is positioned between a heatable compressing plate and a substrate/mold formed of silica or another suitable material in which patterns of high aspect ratio nanoholes have been formed, the pattern of the nanoholes being complementary to the pattern of high aspect ratio nanofibers to be produced. Methods for making molds with patterns of nanoholes formed therein by single-pulse femto-second laser machining are described in detail in US 2015/0093550, herein incorporated by reference in its entirety. The compressing plate, mold and film are heated to a predetermined temperature and a force is applied to the compressing plate so as to press the film against the silica mold. When the temperature of the film material reaches a sufficient level, the softened film material flows into the nanoholes in the mold. In some embodiments with certain materials the softened polymer infiltrates the nanoholes due to surface tension effects only. In other embodiments with films formed of the same or different materials, infiltration of the nanoholes is accomplished by a combination of hydrostatic pressure and surface tension. Thereafter the system is cooled sufficiently to allow the film to be peeled off of the substrate with the molded nanofibers attached to its first surface. The hot-pressing method for producing filter ribbons with nanofiber arrays is described in detail by Hofmeister, et al. in US 2016/0222345, herein incorporated by reference. While hot pressing is a preferred method for forming ribbons for filters of the present invention, solution casting may also be used. The solution casting method for producing filter ribbons with nanofiber arrays is described in detail by Hofmeister, et al. in US 2015/0093550.

As used herein "ribbon" or "ribbon-like structure" refers to an elongate strip of flexible polymeric material having an array of nanofibers formed on at least a portion of one of its planar surfaces. Nanofibers are formed on a functional backing material in web form. In a primary embodiment the webs are post processed by chopping or slitting to form the ribbon or ribbon like structures. However, in some embodiments, the entire web can be a ribbon or ribbon like structure.

As used herein, "wetting" refers to the ability of a liquid to maintain contact with a solid surface. It results from intermolecular interactions when the two are brought together and deals with solid, gas and vapor. A "wettable" surface is one on which a liquid spreads over the surface. A "non-wettable" surface is one in which contact with the surface is minimized causing spherical droplets to form on the surface. A surface can be wetting for some liquids and non-wetting for other liquids. The wetting or non-wetting characteristics of a surface may be enhanced using methods of the present invention.

Reference is made herein to forming nanofiber arrays on the surface of a "film". As used herein, a "film" is a thin, sheet-like, flexibly planar polymeric body with a thickness preferably between 0.05 mm and 1 mm, and more preferably between 0.1 and 0.7 mm.

The extent of liquid spreading on a surface depends on the interfacial free energy balance between the liquid and the surface. Referring to FIG. 1A in which liquid 10 wets surface 12, liquid 10 spreads on the surface, included angle 14 between the margin of liquid 10 and surface 12 is less than 90 degrees. FIG. 2 depicts a non-wetting (hydrophobic in the case of water) surface 22 on which liquid 20 forms a spherical droplet; included angle 24 between the margin of liquid 20 and surface 22 is greater than 90 degrees.

The degree of wetting of a liquid on a surface is determined in a standardized test known as a Sessile Drop Test. The angle between the margin of the liquid and the surface is measured using a contact angle goniometer; a device that delivers a precise amount of liquid through a syringe onto a surface and measures the angle of the liquid at the interface to the surface.

Figure 2A:
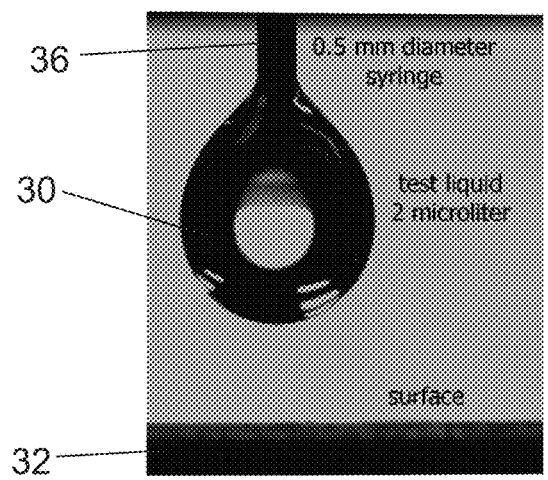
FIG. 2A depicts the start of a Sessile Drop test in which a drop of liquid is applied to a surface to determine the degree of wetting of the surface by the liquid.
Figure 2B:
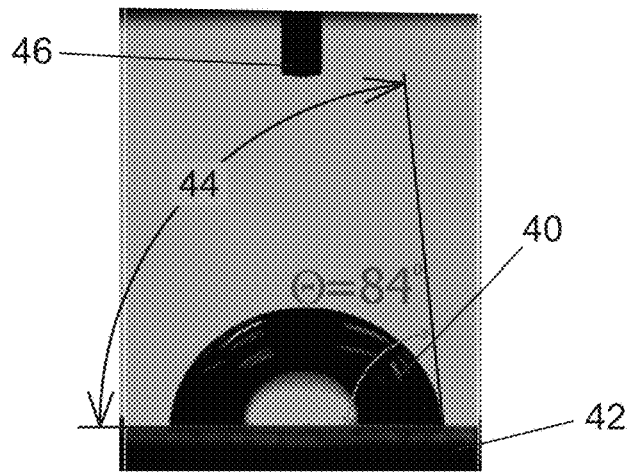
FIG. 2B depicts a Sessile Drop of liquid on a surface for which the liquid is non-wetting.
Figure 2C:
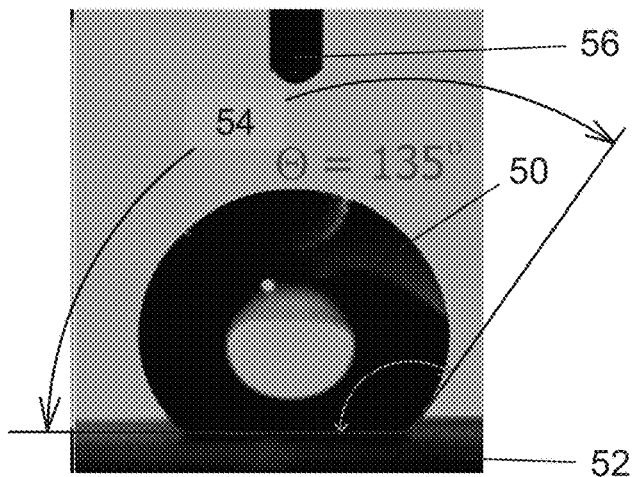
FIG. 2C depicts a Sessile Drop of liquid on a surface of the same material wherein the surface has a texture formed in accordance with the principles of the present invention demonstrating the effect of the texture on wetting performance.

FIGS. 2A through 2C depict a calibrated drop of water applied to a ε-polycaprolactone (PCL) surface. In FIG. 2A, a calibrated drop from syringe 36 is dropped onto surface 32 in preparation for quantitatively determining the degree of wetting of liquid 30 on surface 32. In FIG. 2B surface 42 is "smooth", that is, the surface does not have micro- or nano-structures formed thereon. In FIG. 2C surface 52 has formed thereon an ordered array of nanostructures formed according to the principles of the present invention. In FIG. 2B, the interface of liquid droplet 40 with surface 42 is nearly perpendicular to surface 42 indicating marginal wetting. Angle 54 (FIG. 2C), between the margin of droplet 50 and surface 52 is much greater than angle 44 (FIG. 2B) between the margin of droplet 40 and surface 42 indicating that the degree of wetting of surface 52 is greatly reduced, as also indicated by the spherical shape of droplet 50.

Figure 3A:
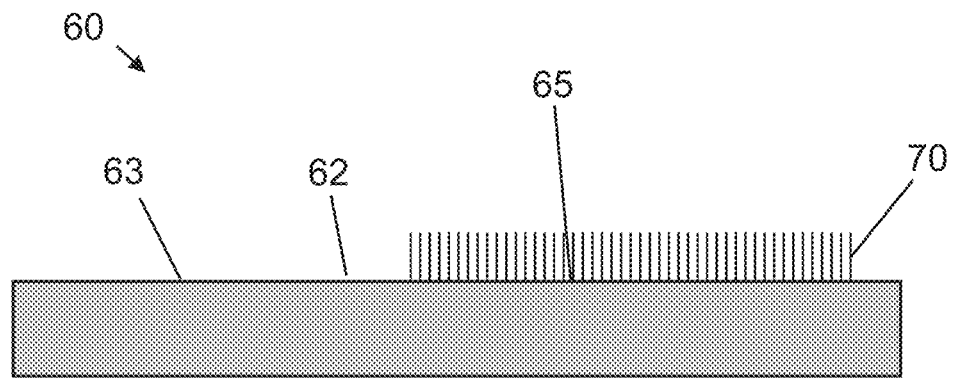
FIG. 3A depicts a cross-section of a material sample in which a first portion of the top surface is has formed thereon a nanoscale texture and a second portion has no texture formed thereon.
Figure 3B:
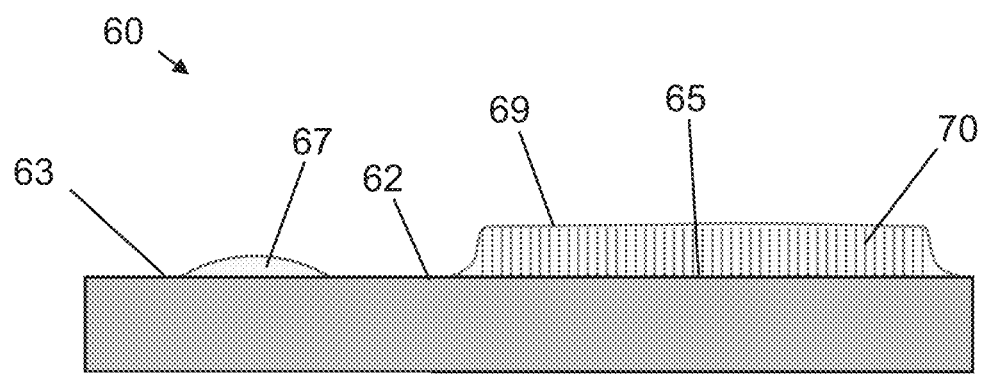
FIG. 3B depicts the material sample of FIG. 3A with a drop of liquid applied to both portions, the liquid wetting the surface.
Figure 3C:
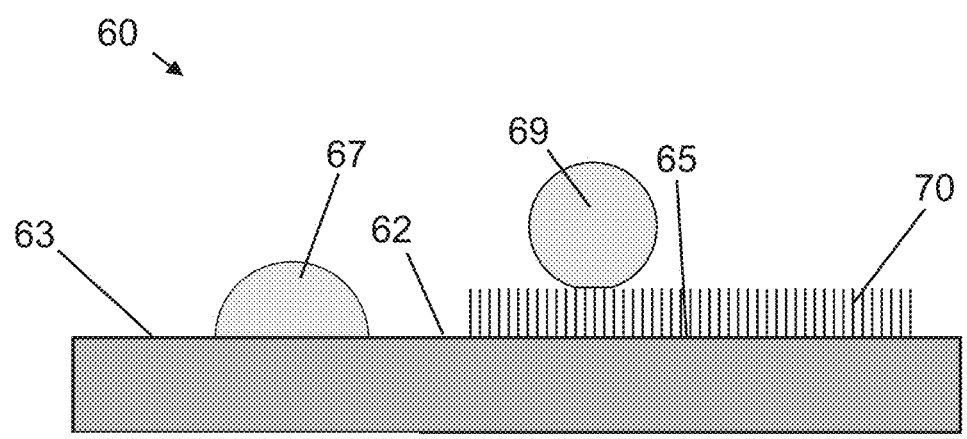
FIG. 3C depicts the material sample of FIG. 3A with a drop of liquid applied to both portions, the liquid being non-wetting.
Figure 4:
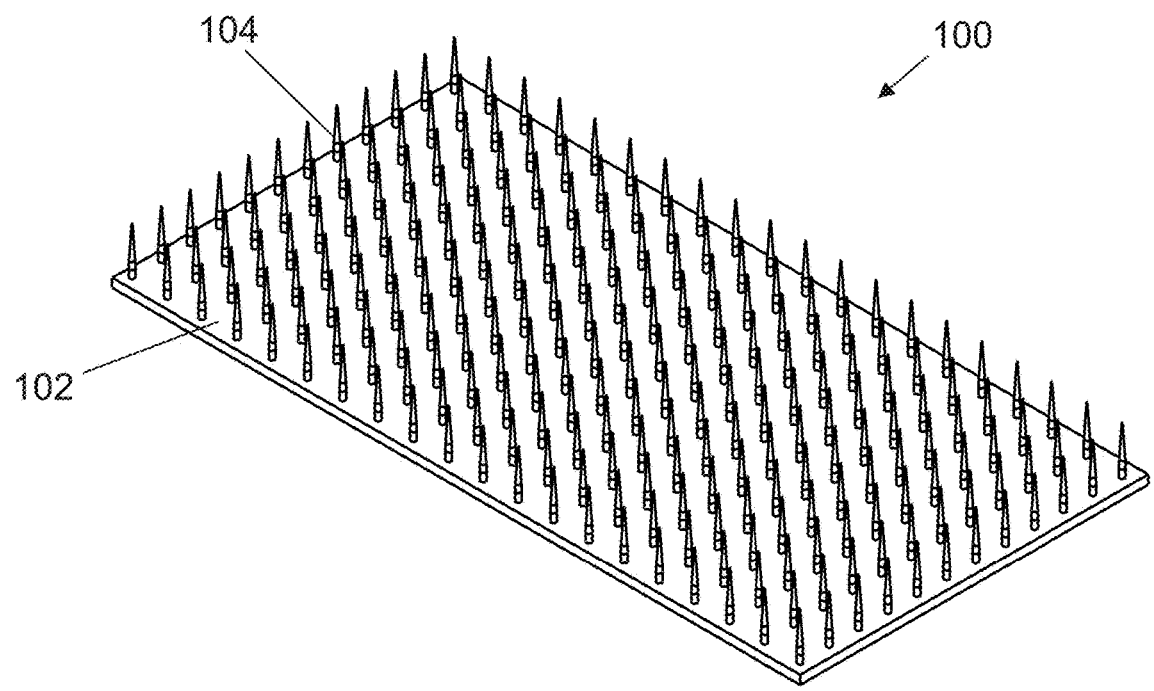
FIG. 4 is a perspective depiction of a film portion with a textured surface formed in accordance with the principles of the present invention.
Figure 5:
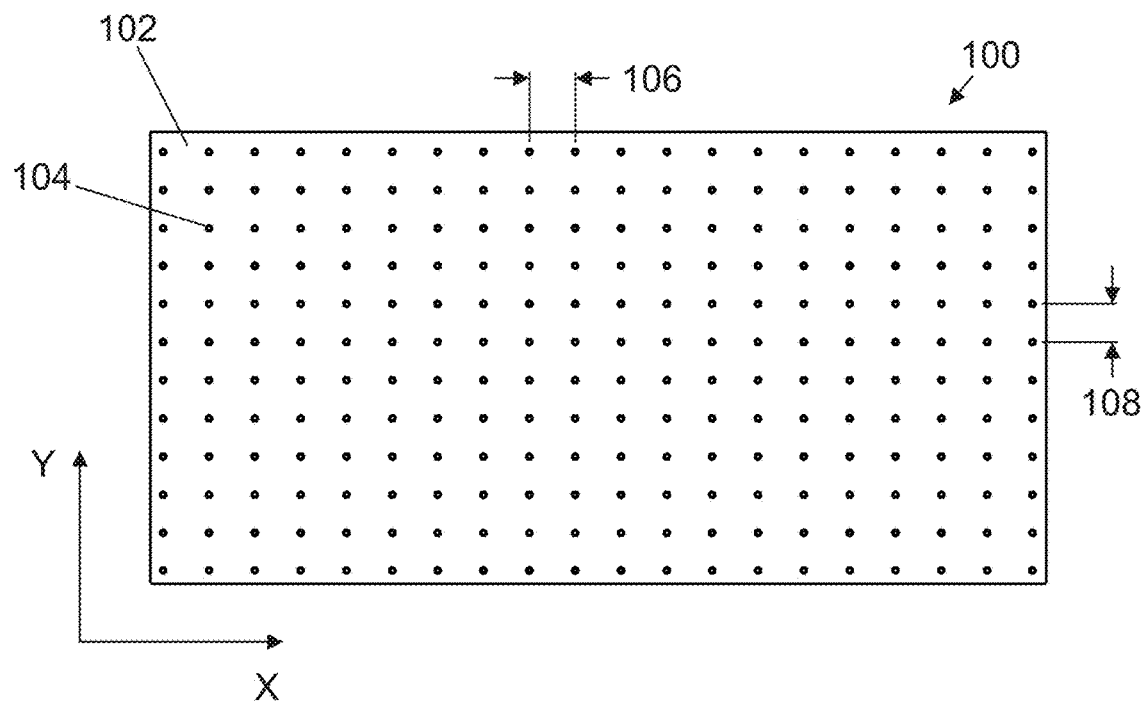
FIG. 5 is a plan view of the objects of FIG. 4.
Figure 6:
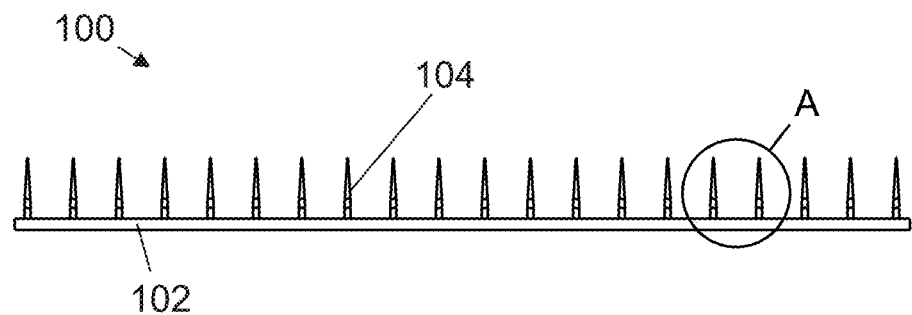
FIG. 6 is a side elevational view of the objects of FIG. 4.
Figure 7:
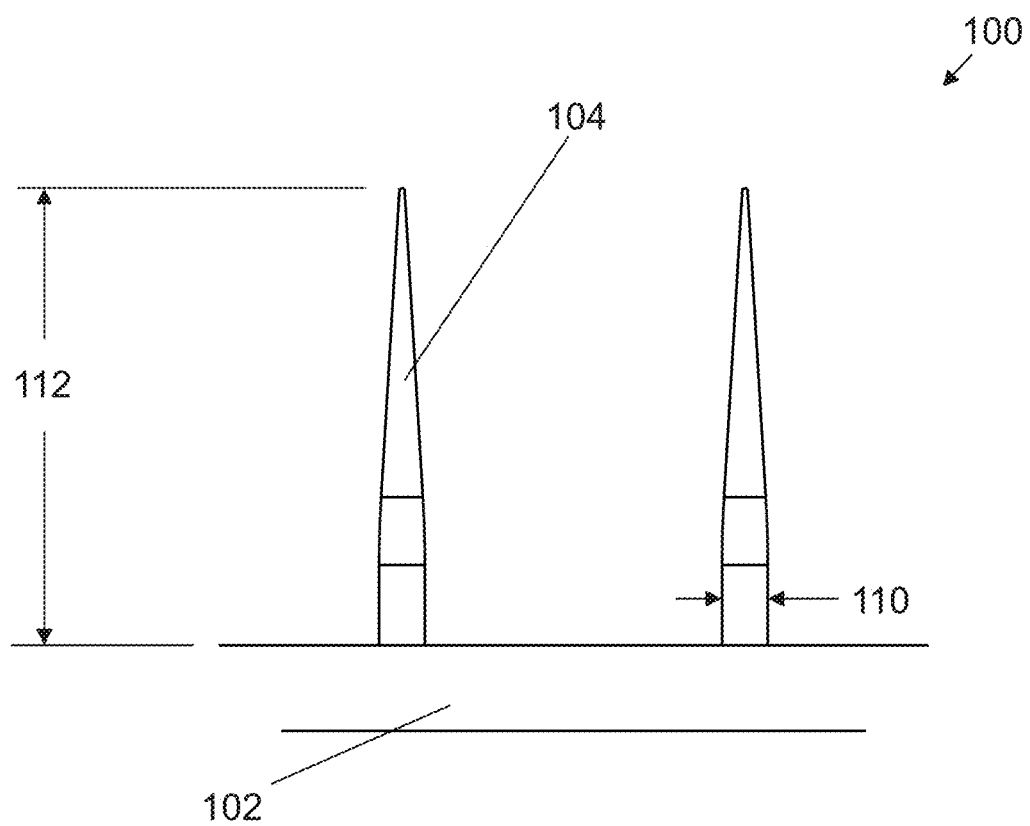
FIG. 7 is an expanded view of the objects of FIG. 6 at location A.

The effect of nanofiber arrays on the wetting behavior of a liquid on a surface is depicted in FIGS. 3A through 3C. As shown in FIG. 3A, polymeric element 60 has a surface 62 with a smooth first portion 63 and a second portion 65 whereon is formed an array of nanofibers 70 in accordance with the principles of the present invention. In FIG. 3B liquid 67 wets first surface portion 63. The wetting is increased by the presence of the nanofibers 70 on second portion 65 as shown by the wetting of liquid 69. Referring now to FIG. 3C, the degree of wetting by liquid 67 on smooth first surface portion 63 is low. On second portion 65 of surface 62 whereon is formed the array of nanofibers 70 the degree of wetting is reduced as shown by spherical droplet 69 formed on nanofibers 70.

Figure 8:
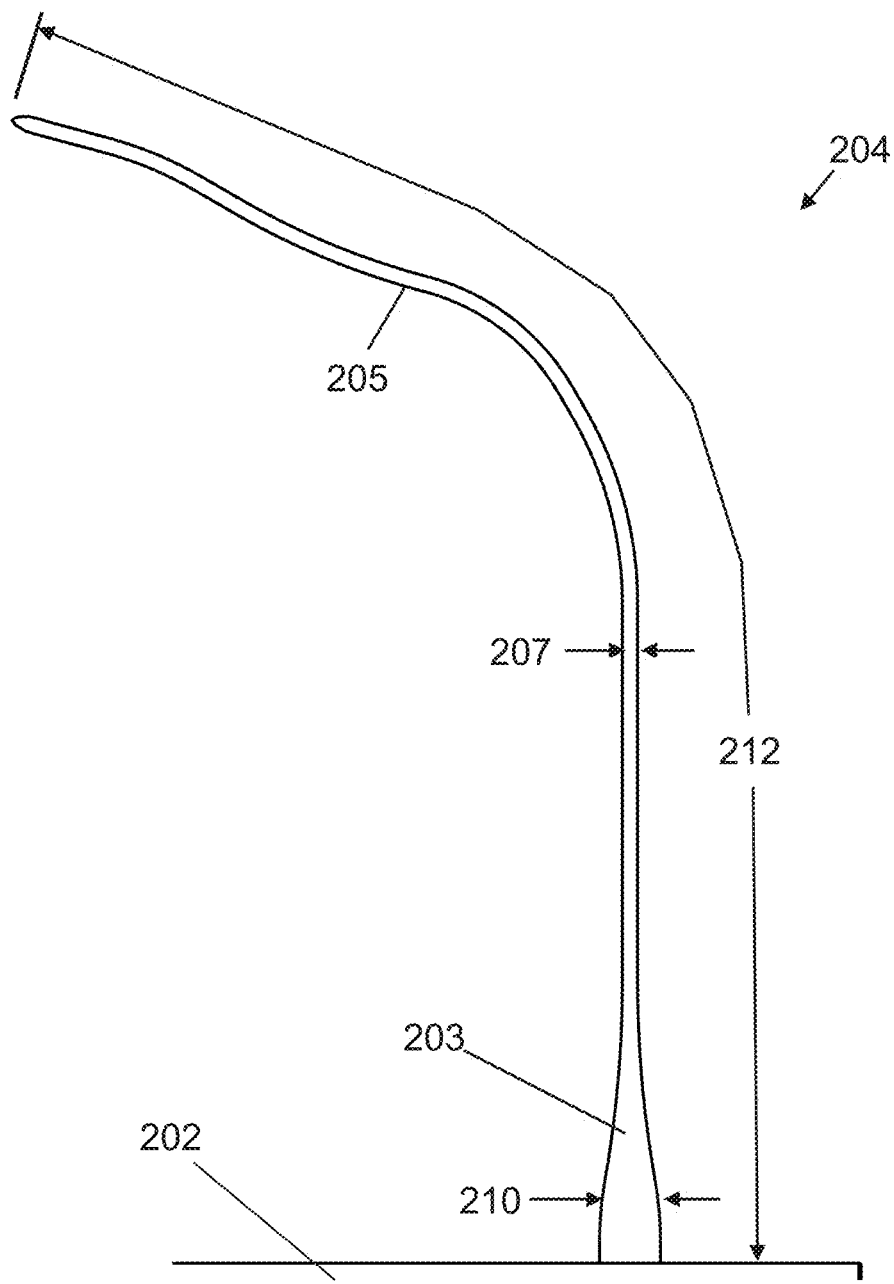
FIG. 8 is a side elevational depiction of a nanofiber of a textured surface of the present invention.

FIGS. 4 through 7 depict a polymeric film 100 with a flexibly planar portion 102 on which are formed an ordered array of nanofibers 104 spaced distance 106 apart in the X direction and distance 108 in the Y direction. Nanofiber 104, shown in FIG. 7 has a needle-like form that tapers over its length 112 from diameter 110 near the base of nanofiber 104. In contrast to the needle-like form of nanofiber 104, nanofiber 204, depicted in FIG. 8, has a less rigid form with a first portion 203 adjacent to planar portion 202 with a first diameter 210, and an elongate flexible second portion 205 with a second diameter 207, the length of nanofiber 204 being greater than that of nanofiber 104 with its needle-like form. Nanofiber 104 and 204 represent extremes of the configuration that nanofibers forming ordered arrays of the present invention may comprise. Indeed, the configurations of nanofibers of the present invention form a continuum between nanofibers 104 and 204, the geometry of the nanofibers for a given application being selected therefrom to optimize the desired effects. The aspect ratios of the nanofibers also form a continuum with needle-like nanofibers 104 with its length 112 being a low multiple of its average diameter being at the low end of the range. Nanofiber 204, with its greater length 212 and smaller average diameter, has a higher aspect ratio. Aspect ratios of nanofibers of the present invention are preferably greater than 10:1 and may be as high as 200:1, the aspect ratio for a given application being selected for optimized performance. For instance, optimal effect for surface wetting may be achieved with nanofibers with aspect ratios of 10:1 or greater, or more preferably with ratios of 20:1 or greater. To optimize non-wetting performance, as in forming a hydrophobic barrier, aspect ratios in the range of 50:1 to 100:1 may be preferable.

Nanofiber arrays vary wetting properties through their structure. The exact placement of fibers and the morphology (or shape) of fibers effects how liquids spread. Many interacting factors participate: surface tension, capillarity, Debye moment, Marangoni forces, Gibbs-Thompson effects, and the complexities of the fiber shape, spacing and stiffness. These important, interrelated phenomena are difficult to model and predict. However, empirical test data that follow demonstrate the ability of nanofiber arrays of the present invention to manipulate wetting properties.

Figure 9:
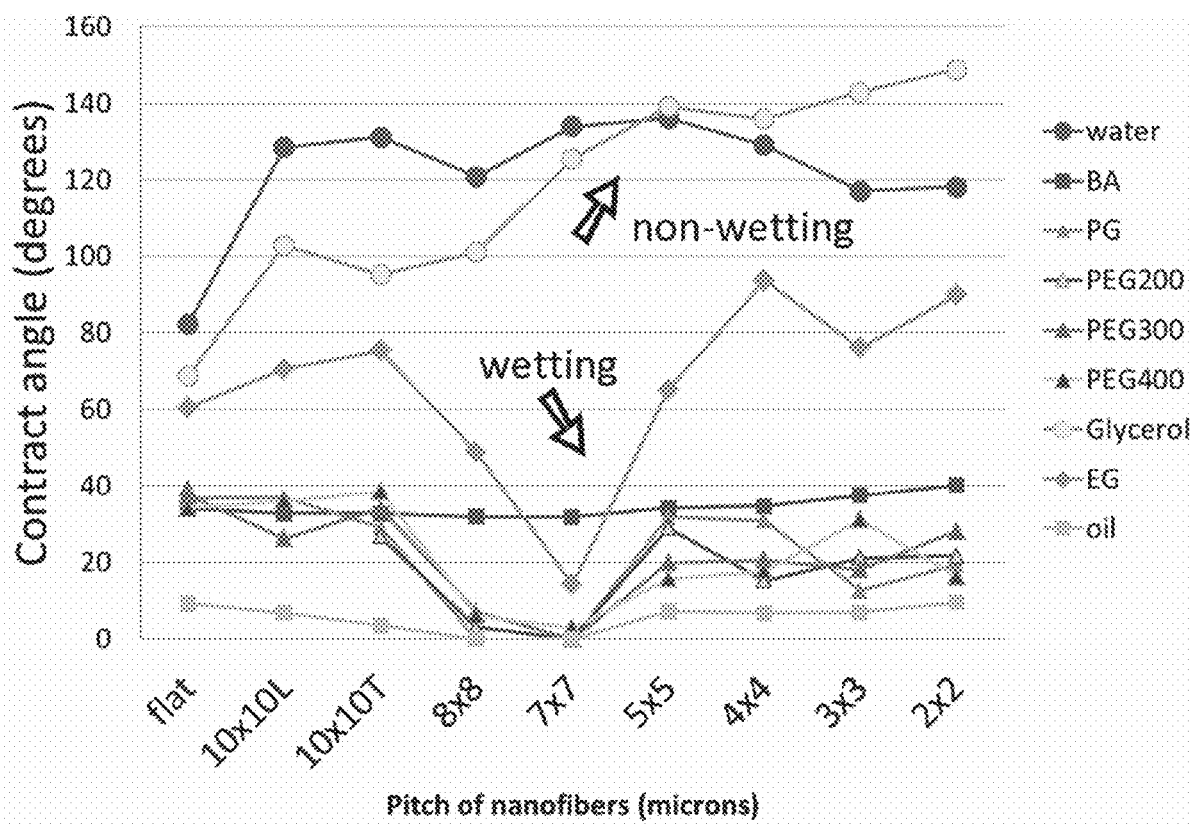
FIG. 9 is a plot showing the effect of the spacing between nanofibers in surface textures of the present invention on the contact angle (wetting) of various liquids.
Figure 11:
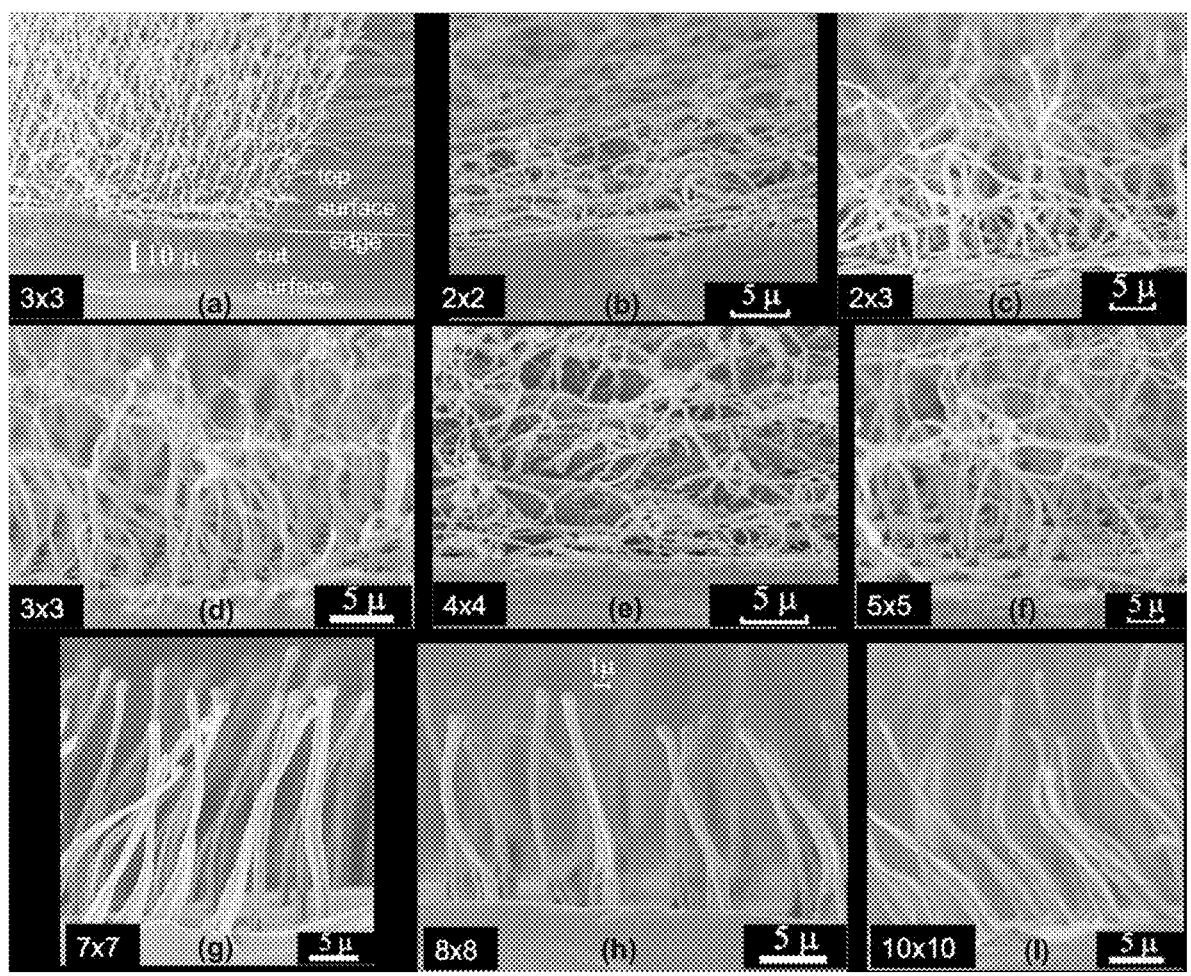
FIG. 11 is a collection of SEM photomicrographs of nanoscale textures used to create the plot of FIG. 9.
Figure 12:
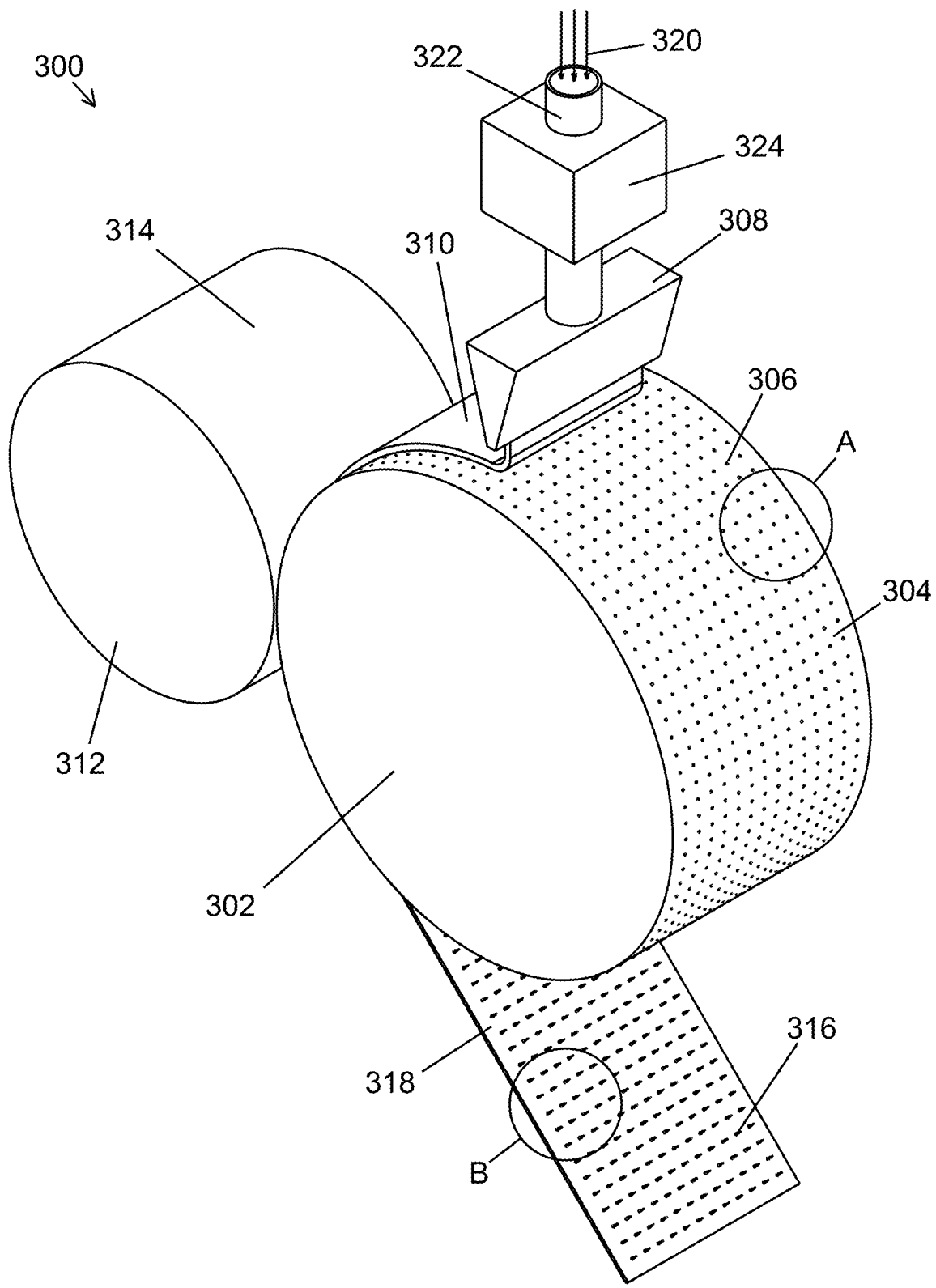
FIG. 12 is a first perspective schematic view of coordinating elements of a system for forming elongate polymeric film having nanoscale textured surface in a continuous process using methods of the present invention.
Figure 13:
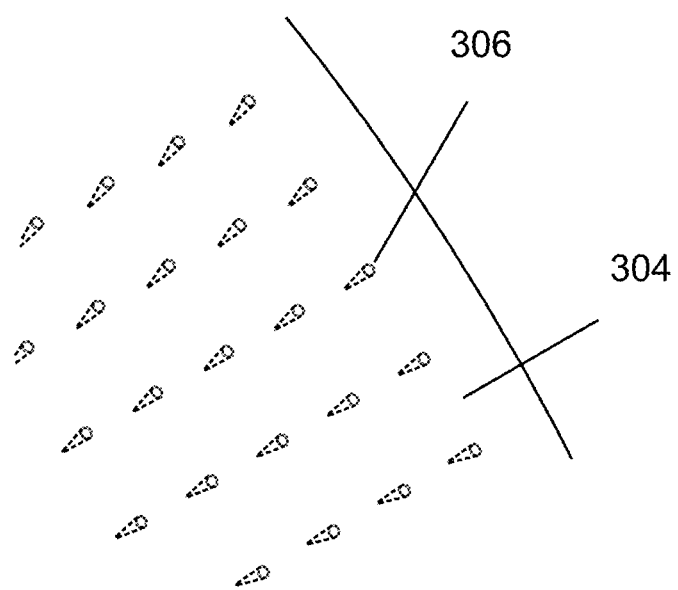
FIG. 13 is an expanded view of the objects of FIG. 12 at location A.
Figure 14:
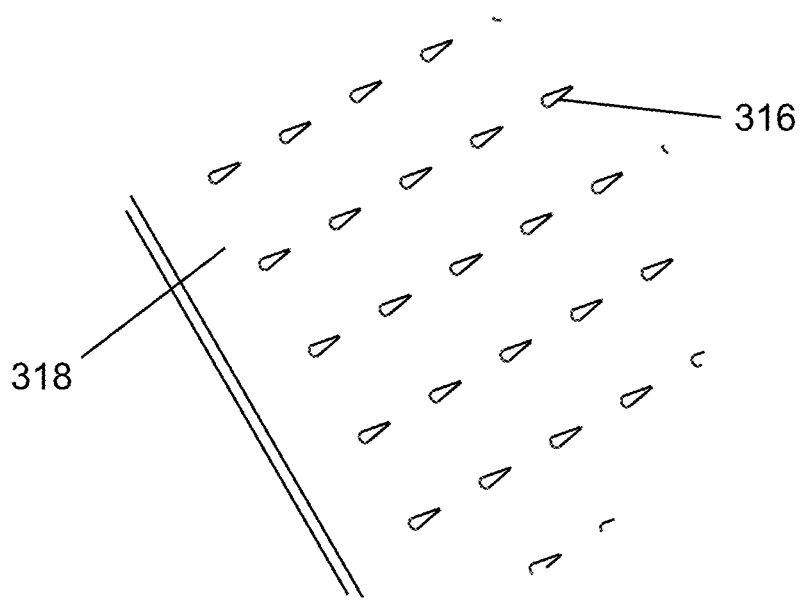
FIG. 14 is an expanded view of the objects of FIG. 12 at location B.
Figure 15:
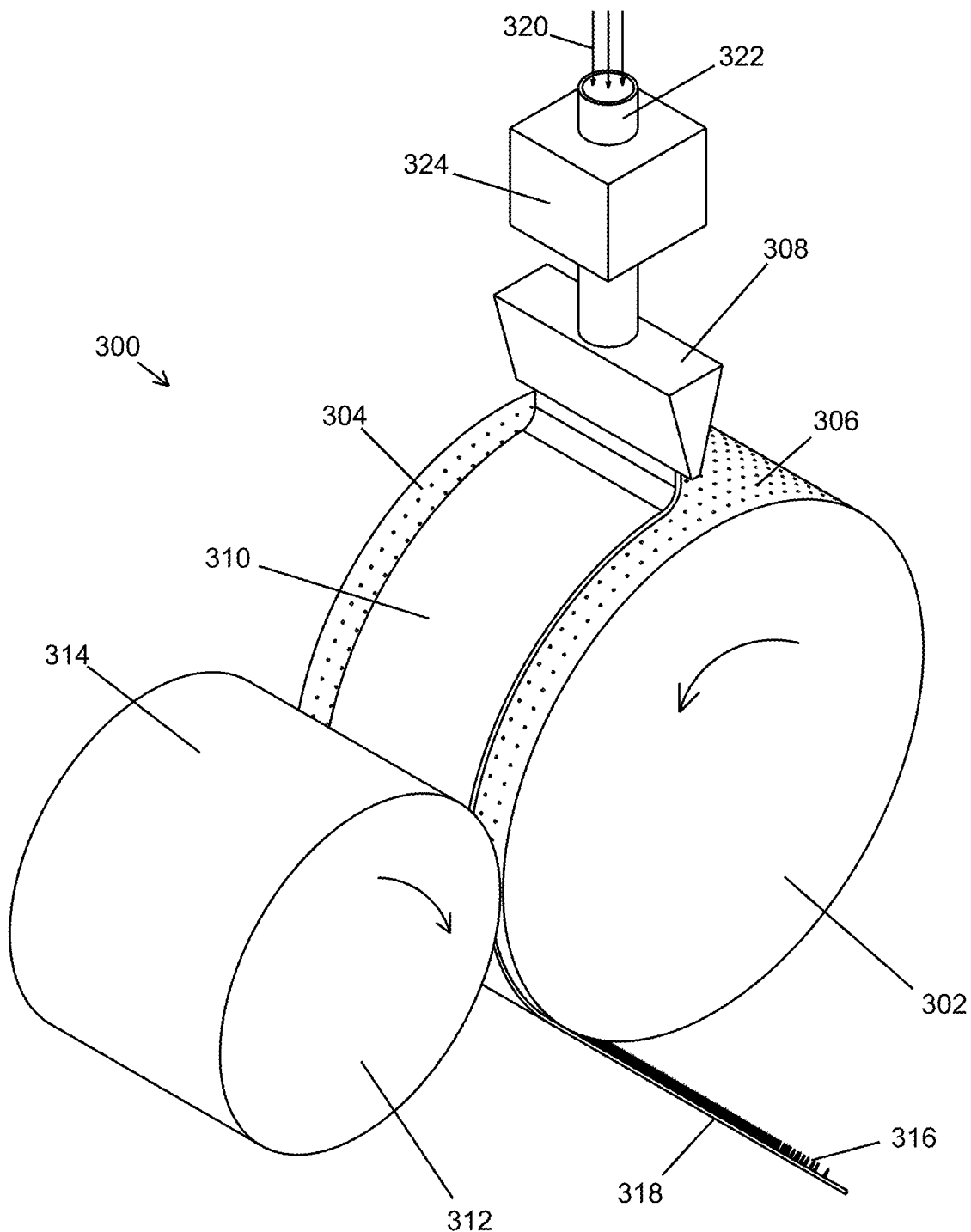
FIG. 15 is a second perspective view of the objects of FIG. 12.
Figure 16:
FIG. 16 is a plan view of a moisture collector formed using polymeric surfaces with nanofiber arrays formed in accordance with the principles of the present invention.
Figure 17:
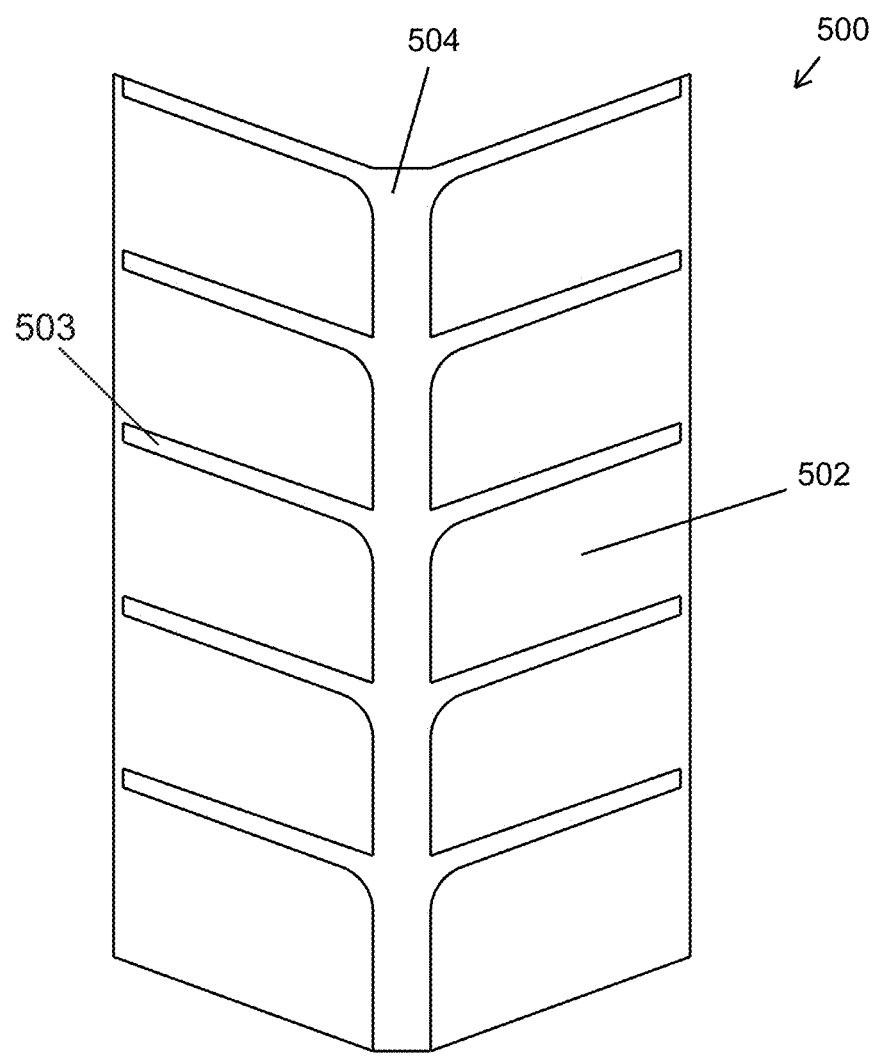
FIG. 17 is a side elevational view of the objects of FIG. 16.
Figure 18:
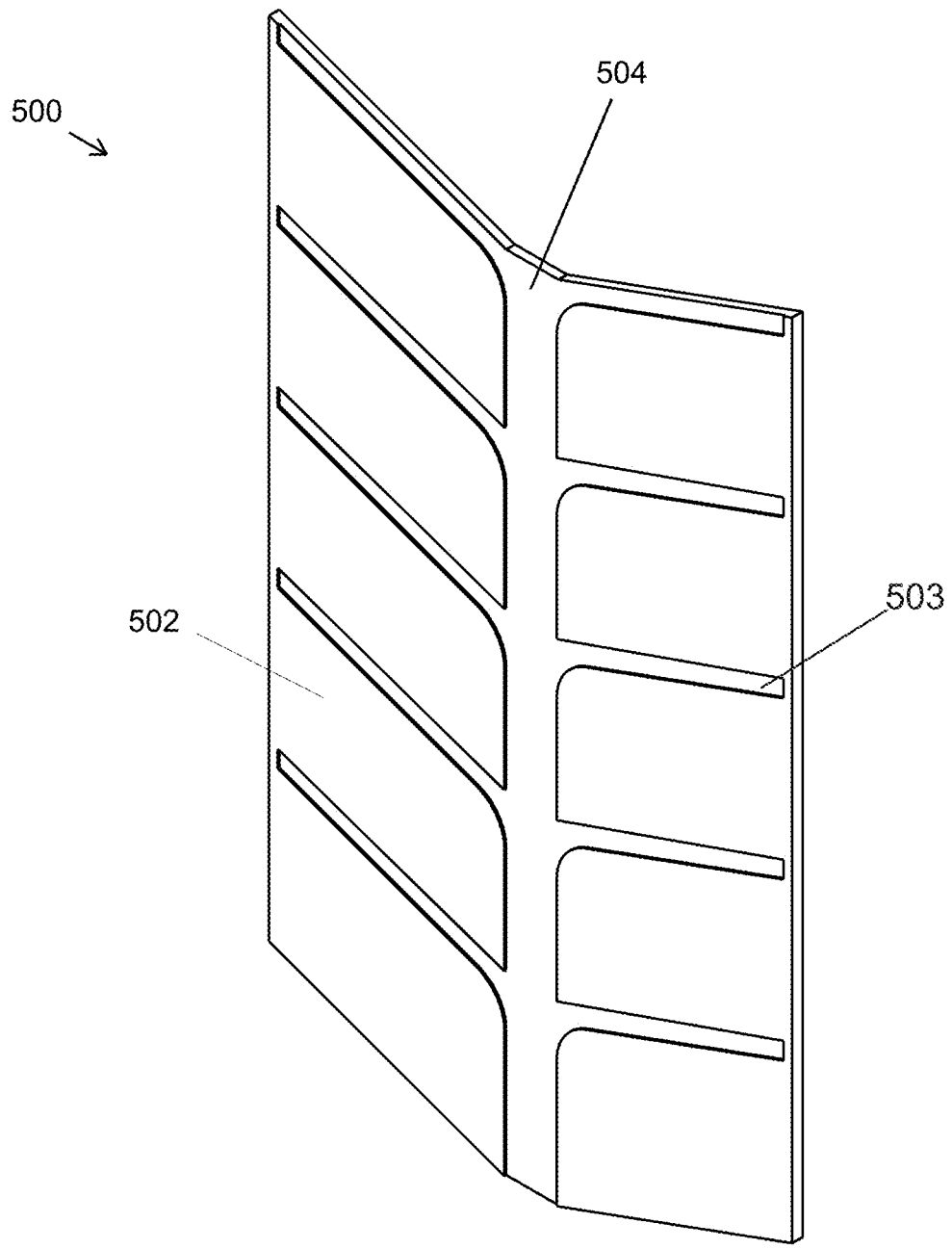
FIG. 18 is a perspective view of the objects of FIG. 16.

Nanofiber arrays with a range of spacings (pitch) between fibers were constructed on the surfaces ε-polycaprolactone (PCL) specimens. The PCL material tested is an inexpensive, biodegradable polyester used in cell culture, packaging, rapid prototyping and tissue engineering. A number of different liquids were tested; water, ethylene glycol, polyethylene glycol, polypropylene glycol, hexane, glycerol, motor oil, benzyl alcohol, and n-hexane. These liquids have a range of properties; water, for example, is very polar and easily forms hydrogen bonds, while n-hexane is not polar at all. PCL has an ester link and therefore a dipole moment. Eight different nanofiber arrays were tested with the liquids. The results are shown in FIG. 9. "Pitch" is the distance in microns between fibers, so the density of fibers goes up from left to right. A list of the nanofiber array dimensions and process conditions are listed in Table 1 of FIG. 10. Scanning electron micrographs of the PCL samples are shown in FIGS. 11(*a*) through 11(*i*).

Water falls on the boundary between wetting and non-wetting as shown in FIG. 9. However, water does not wet nanofiber arrays of PCL. Glycerol wets the flat surface better than water and becomes more non-wetting as the density of fibers increases. The 30 weight non-detergent oil wets PCL.

An unexpected result is the "notch" wettability of glycols. Enhanced wettability of glycols exists at a particular spacing and geometry. Of special note, ethylene glycol is non-wetting on the flat surface and on the surface with the 10×10 pitch arrays. It becomes marginally wetting with the 8×8 pitch arrays, highly wetting with the 7×7 pitch arrays, and then non-wetting for 5×5 pitch and higher nanofiber densitites. These results show that there are patterns that can optimize the difference in wetting properties for two fluids. Water and oil, and water and glycols, for example, are the most different at the 7×7 and 8×8 patterns.

The inventors have demonstrated that an inexpensive plastic—with a particular nanofiber array—is perfectly wetting for glycols and oils and non-wetting for water. Wetting behavior of a liquid on a surface is directly related to the free energy of absorption by the vapor on a surface. The inventors have determined that this material will effectively, preferentially filter glycols and oils from the vapor while allowing polar compounds, alkaloids, such as nicotine, to pass the filter.

Using principles of the present invention, disclosed herein are methods for modifying, enhancing and optimizing the wetting behavior of surfaces through the forming of arrays of high aspect ratio nanofibers thereon. Also disclosed are methods for forming materials with engineered wetting behavior through the forming thereon of nanofiber arrays. The scalable production methods used do not require the use of solvents or high voltages. In preferred embodiments the manufacturing processes are continuous and produce elongate films with nanofibers formed on at least a portion of one surface. In some embodiments these elongate films are slit to form narrow ribbons that can be formed into woven or non-woven fabrics or constructs. In other embodiments non-continuous longitudinal slits are formed in the elongate films so as to produce perforated sheet-like materials that can be stacked together to form filter media or selectively absorbing structures. In yet other embodiments, the elongate film is chopped into small pieces that may be incorporated into filter media so as to impart engineered wetting behavior.

A preferred method for manufacturing materials with engineered wetting properties has the ability to produce continuous elongate strips of film with arrays of nanofibers formed on at least one surface thereof. In method 300, a novel variation of a film producing technique referred to as "chill roll casting" and depicted in FIGS. 12 through 15, polymer 320 is supplied via tubular member 322 to extrusion head 308. Polymer 320 is flowably heated above its melt point by heater 324 and the melted polymer 310 is then applied to rotating cylindrical roll 302 (referred to as a "chill roll") formed of silica or another suitable material. An array of high aspect ratio nanoholes 306 is formed in the circumferential surface 304 of roll 302 so as to form a mold, the nanohole array being complementary to the array of nanofibers to be formed. The nanoholes are formed by single-pulse femtosecond laser machining using methods previously described herein. Molten polymer 310 flows into nanoholes 306 as it is applied to circumferential surface 304 of rotating chill roll 302. Chill roll 302 is maintained at a temperature such that during a predetermined portion of the roll rotation of chill roll 302, polymer 310 in nanoholes 306 solidifies along with the portion of polymeric material 310 coating circumferential surface 304 of roll 302. A cylindrical metallic roll 312, referred to as a "anvil roll" or "quench roll," functions as the compressing element and is positioned adjacent to chill roll 302 such that after a predetermined angular rotation of chill roll 302 polymeric material 310 coating the surface of chill roll 302 is compressed between surface 304 of chill roll 302 and surface 314 of the quench roll 312. As implied by the name "quench roll" polymeric material 310 undergoes rapid cooling during contact with quench/anvil roll 312 so that it may be subsequently stripped from the surface of chill roll 302 as a continuous elongate strip of film 318. When polymer strip 318 is removed from chill roll 302, material 310 that had previously flowed into nanoholes 306 forms molded nanofibers 316 on the surface of film strip 318. In subsequent processing elongate strips 318 may be slit, cut, chopped or otherwise formed into filter ribbons of the present invention. As with the previously described hot pressing method, polymer 320 is not contained in a solution so the use of environmentally undesirable solvents is not required.

Under certain conditions, with suitable polymers, quench roll 312 is eliminated. The thickness of film strip 318 is determined by process parameters. These may include properties of polymer 320, the temperature of polymer 310 as it is deposited on surface 304 of chill roll 302, the temperature and rotational speed of chill roll 302, and other factors that affect the cooling of film strip 318. Under these conditions, material is drawn into nanoholes 306 of surface 304 of chill roll 302 by surface tension.

In the methods of manufacture previously herein described, reference is made to molds made of silica or another suitable material. Among these suitable materials are transparent materials like borosilicate glass, soda lime glass, BK7 optical glass, plastic, single-crystal quartz, diamond and sapphire. All have been successfully micromachined with femtosecond laser pulses. Fused silica is a preferred material since it offers a combination of properties including wide range of spectral transparency, low autofluorescence, good biocompatibility, chemical inertness, near zero thermal expansion, excellent thermal shock resistance, and low dielectric constant and losses.

Any alternate method capable of producing integral arrays of nanofibers of predetermined lengths, diameters, and profiles formed on a surface of a film and substantially perpendicular to a first surface of a film, and further, wherein the spatial arrangement of the fibers has a predetermined pattern, may be used. All fall within the scope of this invention.

Using the foregoing methods, nanofiber arrays with a variety of mechanical, electrical and chemical properties, Debye moments, tailored affinities, and functional binding sites can be produced from almost a wide variety of polymers without the use of solvents or high voltage electrical fields.

Nanofibers forming nanofiber arrays disclosed herein can be composed of virtually any thermoplastic polymer, polymer resin, or similar material. Non-limiting examples of suitable polymers include nylon, poly(.epsilon.-caprolactone) (PCL), polyethylene oxide (PEO), polyvinyl alcohol (PVA), polyvinyl chloride (PVC), polyvinyl formal (PVF), polyisoprene, trans (PI), polypropylene (PP), low-density polyethylene (LDPE), high-density polyethylene (HDPE), PIP castline (PiPc), PIP natural (PiPn), polyvinylidene fluoride (PVDF), poly-lactic acid (PLA), and poly-L-lactic acid (PLLA). It should be understood that a blend of two or more such polymers can also be used. It should also be understood that a blend or block co-polymer of two or more such polymers can also be used. For example, in one embodiment, a blend of block co-polymer comprising PCL-block-PEO can be used to alter the functionality of the backing member and nanofibers.

As previously herein described, nanofiber arrays of the present invention formed on a surface affect the wetting of a liquid on that surface. This aspect is exploited in moisture collector 500 depicted in FIGS. 17 through 21. Collector 500 has discrete collecting regions 502 separated by elongate drain channels 503 and central channel 504 to which drain channels 503 connect. Drain channels 503 slope downward toward central channel 504. Moisture collector 500 is configured such that multiple collectors 500 may be affixed to a vertical surface in the same manner as tiles, the central channels forming a continuous downward path. Collecting regions 502 have formed on their surfaces nanofiber arrays of the present invention, the arrays being optimized so that water does not wet them, but rather so that water droplets form on the nanofibers of surfaces of collecting regions 502. Classical nucleation theory (Volmer, Weber, 1925) describes the formation of water droplets from the vapor. Heterogeneous nucleation sites are energetically favored for the nucleation and growth of water droplets from the vapor. For example, the Gibbs-Thompson effect stabilizes droplets on structures in regions 502 on fiber tips with a radius of curvature less than that of a critical size droplet. Drain channels 503 and channels 504 do not have nanofiber arrays formed on their surfaces, but rather are smooth, thereby facilitating collection and run-off.

Figure 21:
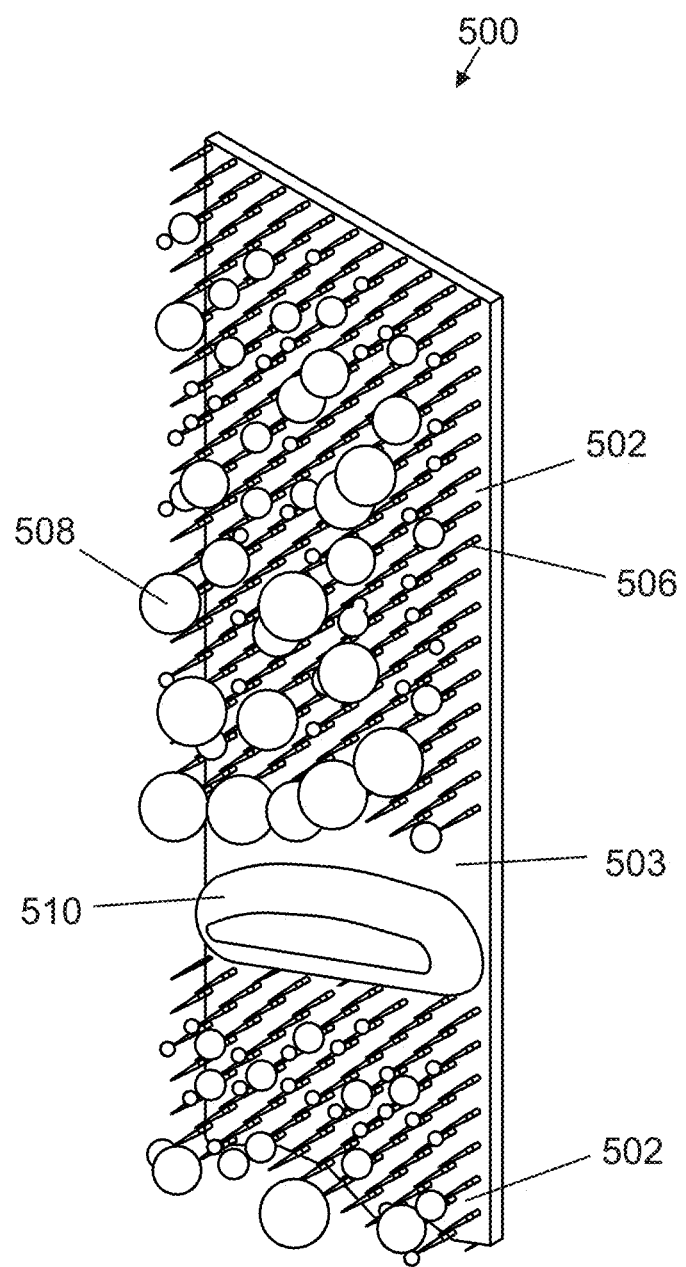
FIG. 21 is a perspective view of the portion of FIG. 19.

Referring now to FIGS. 19 through 21, water droplets 508 form on nanofibers 506. As the size of a droplet 508 increases, gravity causes the droplet to travel downward on the nanofiber array. A droplet 508 encounters other droplets 508 that are in its path. When a droplet 508 encounters another droplet 508, surface tension causes the droplets to combine to form a larger droplet 508 that continues at an increased rate on a downward path due to the increased gravitational pull on the larger droplet 508, collecting other droplets 508 in its path. This process continues until the downward traveling droplet 508 encounters a drain channel 504. Droplets 508 wet the surfaces of drain channels 504 and collect into larger heavier wetting volumes 510 that are pulled by gravity to central channel 504 of moisture collector 500. Because drain channels 504 are bound on their lower surfaces by less- or non-wetting nanofiber arrays, the collected water 510 remains in channel 503 and flows to the central channel 504.

Figure 22:
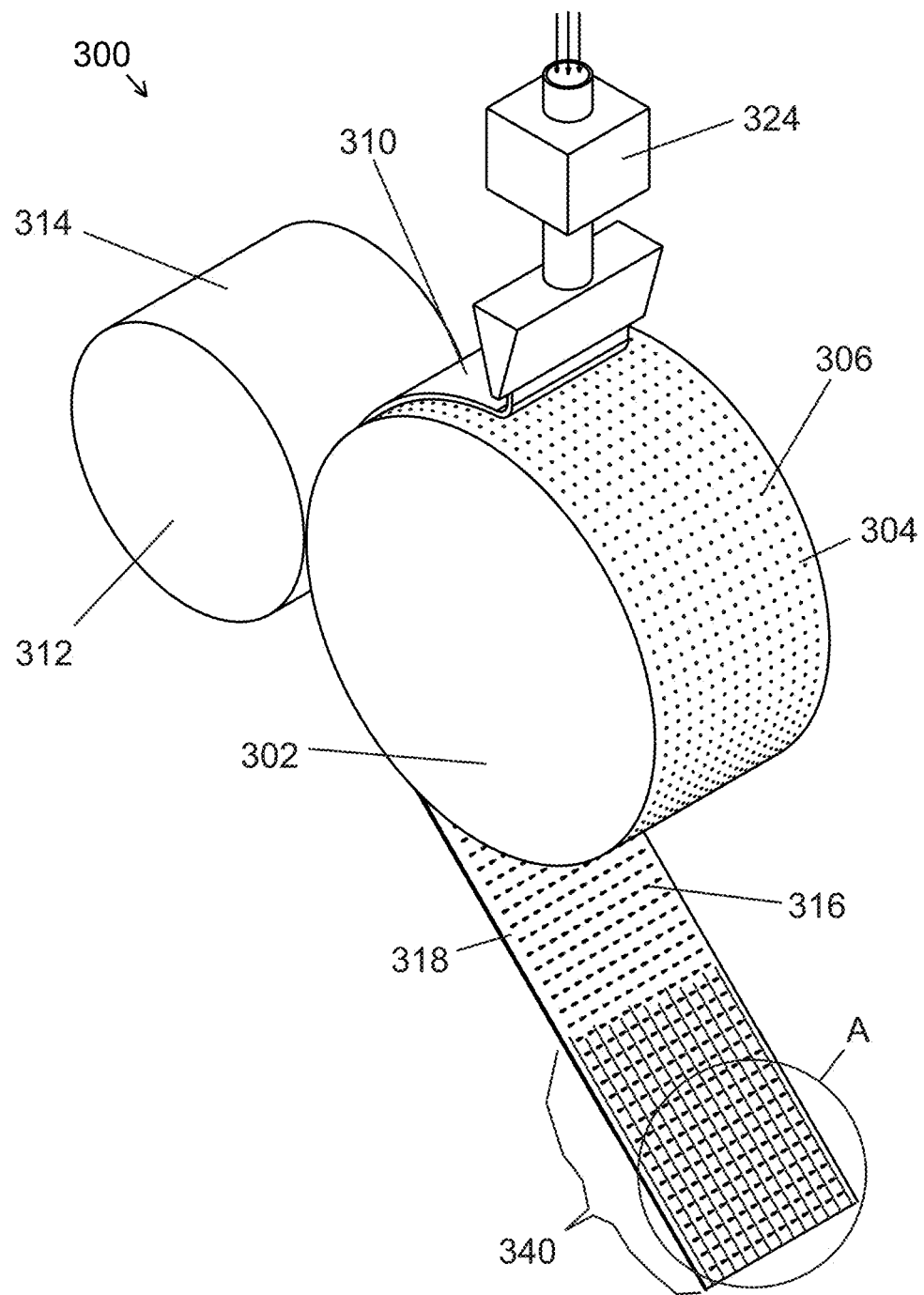
FIG. 22 is a perspective view of the objects and system of FIG. 12 wherein a slitting process has been added to create multiple elongate ribbon-like elements from the elongate polymeric film created by the elements and method of FIG. 12.
Figure 23:
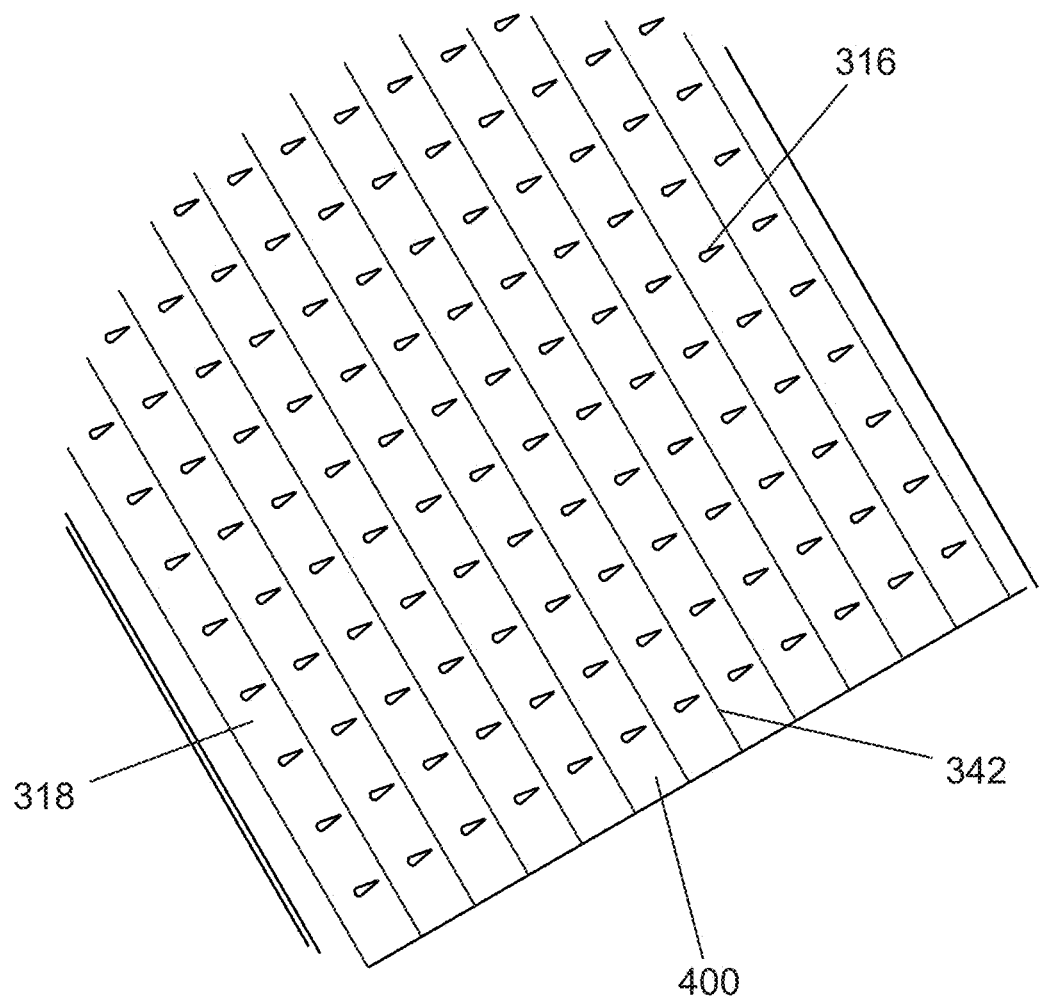
FIG. 23 is an expanded view of the objects of FIG. 22 at location A.
Figure 24:
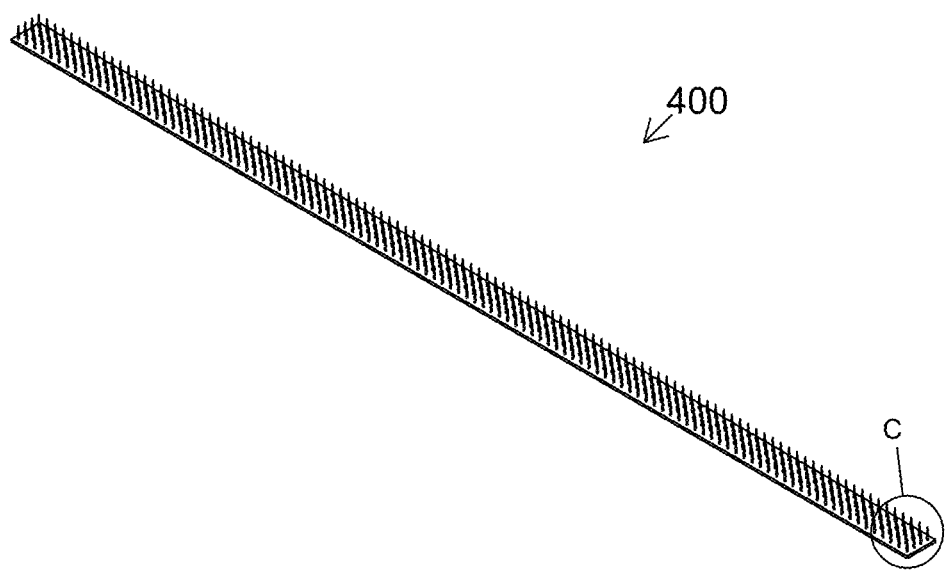
FIG. 24 is a perspective depiction of an elongate ribbon-like element formed by the objects and method of FIG. 22.
Figure 25:
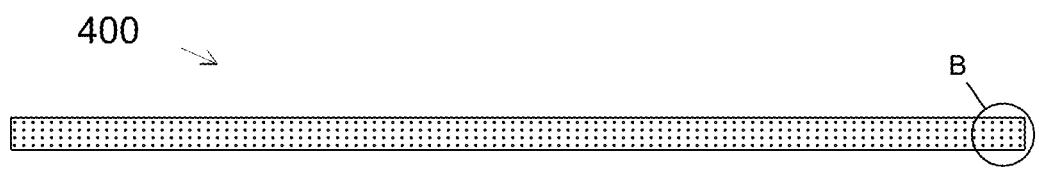
FIG. 25 is a plan view of the objects of FIG. 24.
Figure 26:
FIG. 26 is a side elevational view of the objects of FIG. 24.
Figure 27:
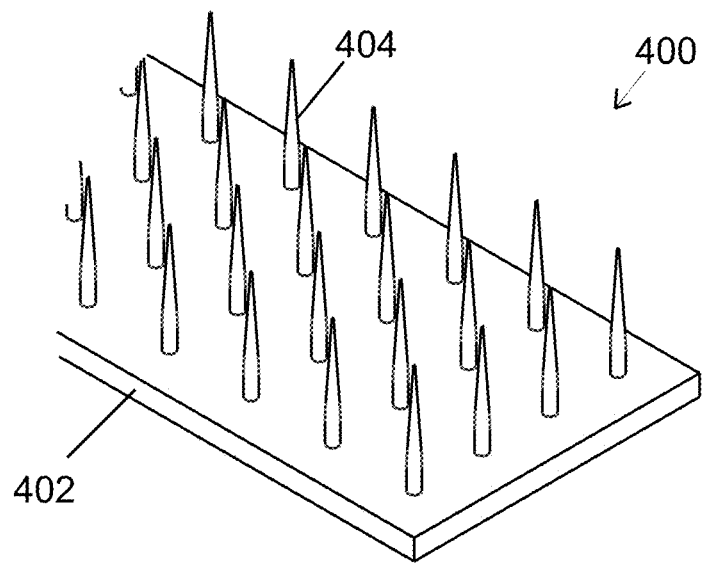
FIG. 27 is an expanded view of the objects of FIG. 24 at location C.
Figure 28:
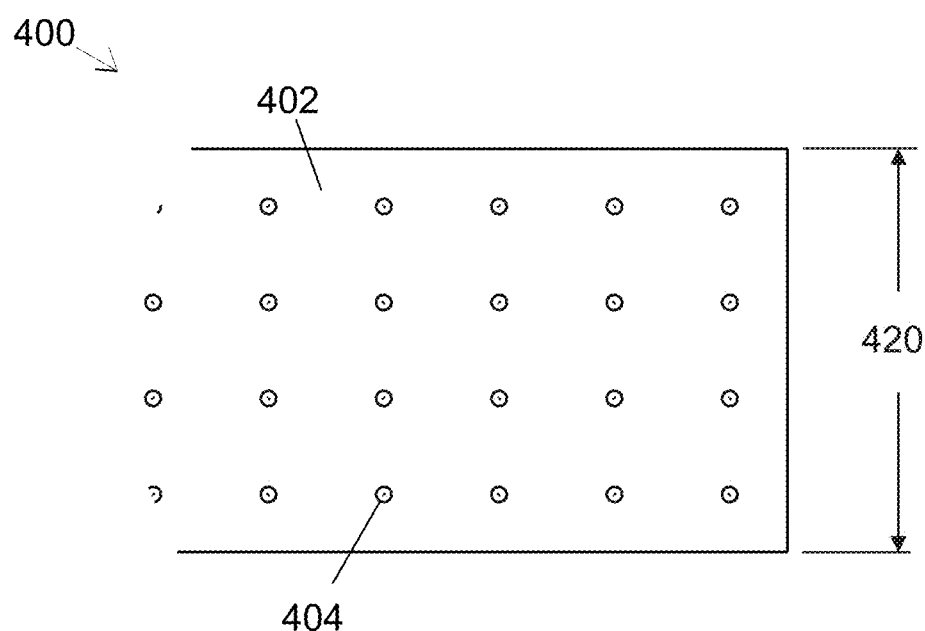
FIG. 28 is an expanded view of the objects of FIG. 25 at location B.
Figure 29:
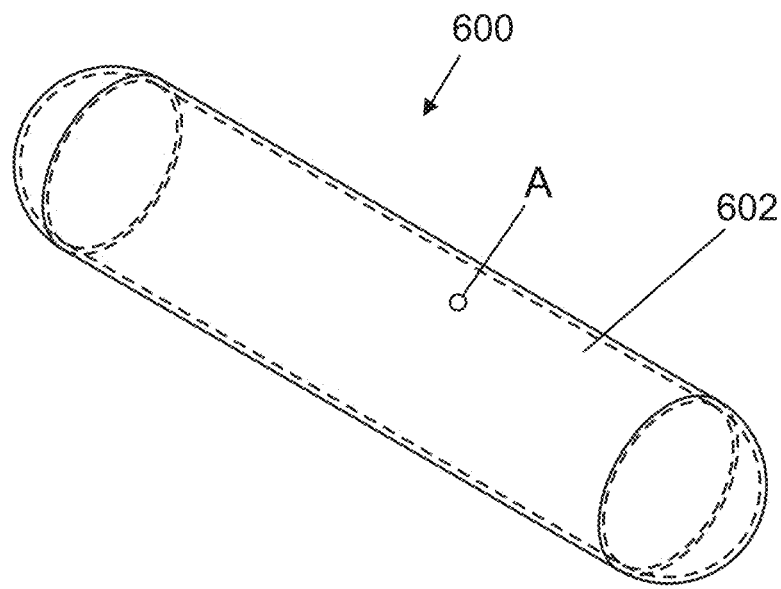
FIG. 29 is a perspective view of an absorptive device of the present invention wherein a first liquid may be selectively separated from a mixture containing first and second liquids.
Figure 30:
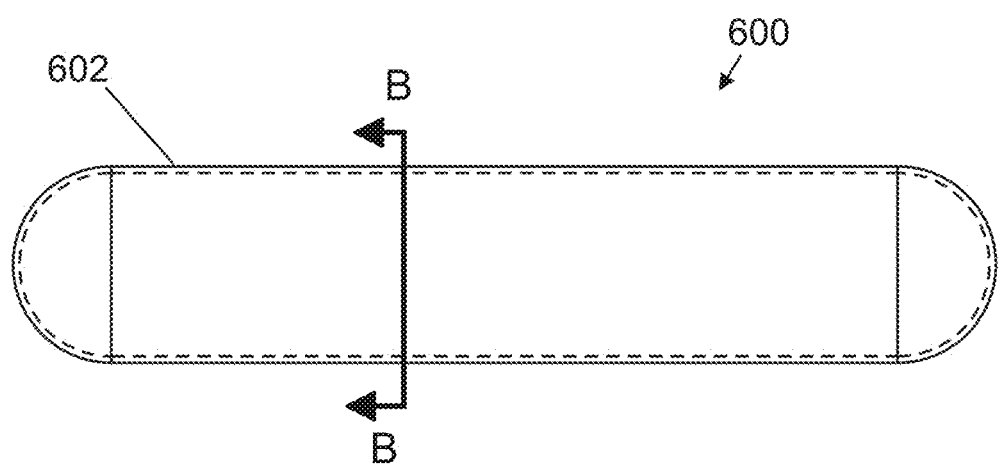
FIG. 30 is a side elevational view of the objects of FIG. 29.
Figure 31:
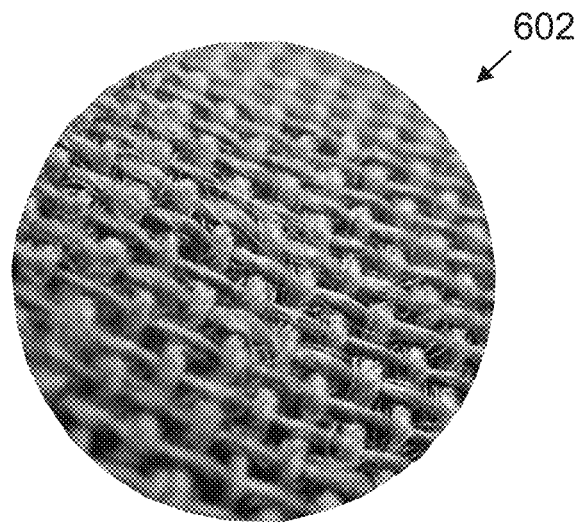
FIG. 31 is an expanded view of the outer material layer of the absorptive device of FIG. 29 at location A.
Figure 32:
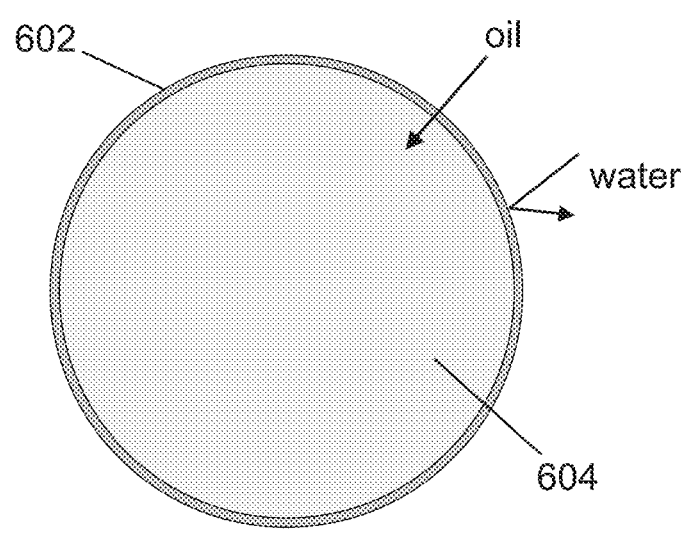
FIG. 32 is a sectional view of the objects of FIG. 30 at location B-B.

System 300, shown in FIGS. 12 through 15, produces a continuous film strip 318 with the width of strip 318 being determined by the width of chill roll 302 and anvil roll 312. It some cases it may be desirable to form a plurality of elongate ribbons that may be formed into a yarn and woven to create a structure, or that may be formed into a non-woven structure. FIGS. 22 and 23 depict a system 300 wherein a means forms continuous longitudinal slits 342 in strip 318 so as to create a plurality of ribbons 400 as depicted in region 340 of strip 318. The slitting means may be a pair of rotary cutting rolls, a die, knife edges or any other method suitable for slitting thin polymeric sheet in a continuous process. All fall within the scope of this invention.

FIGS. 24 through 28 depict a film ribbon formed by slitting film strip 318 as previously described. Ribbon 400 has a flexible flat planar portion 402 on which are formed an array of nanofibers 404. Width 420 of ribbon 400 is preferably between 0.1 and 2 millimeters, more preferably between 0.2 and 1 millimeters, and still more preferably between 0.2 and 0.5 millimeters. Width 420 may be optimized for various specific applications, and for considerations related to subsequent manufacturing steps. For instance, multiple ribbons 400 of narrow width may be formed into, or incorporated into, a yarn for producing fabric with enhanced wetting properties due to the presence of nanofibers 404 on ribbons 400 that form the yarn. The plot of FIG. 9 shows the relationship between fiber spacing in an array on a surface and the effect on wetting or non-wetting behavior of various fluids on that surface. When the nanofiber array has 7×7 spacing, the non-wetting behavior of water on the surface is enhanced while the wetting behavior of oil is also enhanced. A fabric woven using yarn formed of ribbons 400 with the 7×7 spacing between nanofibers in the arrays formed on ribbons 400 will be non-wetting to water but wetting to oil. These characteristics are exploited in the selectively absorptive structure (called a "sock") 600 of FIGS. 29 through 32.

Sock 600 has a flexible tubular containment portion 602 made of loosely woven fabric (see FIG. 31), the fabric being formed using yarn comprising ribbons 400. The nanofiber arrays on the ribbons 400 are configured with the 7×7 spacing of FIG. 9. The inside of containment portion 602 of sock 600 is filled with an oil absorbing batting material 604 of suitable composition. Because oil wets the material of containment portion 602, oil passes through containment portion 602 and is absorbed in batting material 604. Because water does not wet the material of containment portion 602, water does not pass through containment portion 602 and is not absorbed in batting material 604. The selective absorption characteristics of sock 600 enable the efficient removal of oil from water after an oil spill. In a preferred embodiment ribbons 400 are formed of polypropylene. In other embodiments other suitable polymeric materials are used.

Sock 600 described above has a containment portion 602 formed by weaving yarn made of ribbons 400. In other embodiments, elongate ribbons 400 form a non-woven fabric. In these embodiments ribbons 400 may be deposited on a surface to form a mat and then compressed and bonded to form a sheet of material with wetting properties determined by the nanofiber arrays formed on the ribbons 400 comprising the sheet. In still other embodiments, ribbons 400 may be chopped after slitting to produce ribbons 400 of a short-predetermined length. These chopped ribbons 400 may be used to form a non-woven sheet material as previously described or formed into non-woven mats in the manner of filter media.

Figure 33:
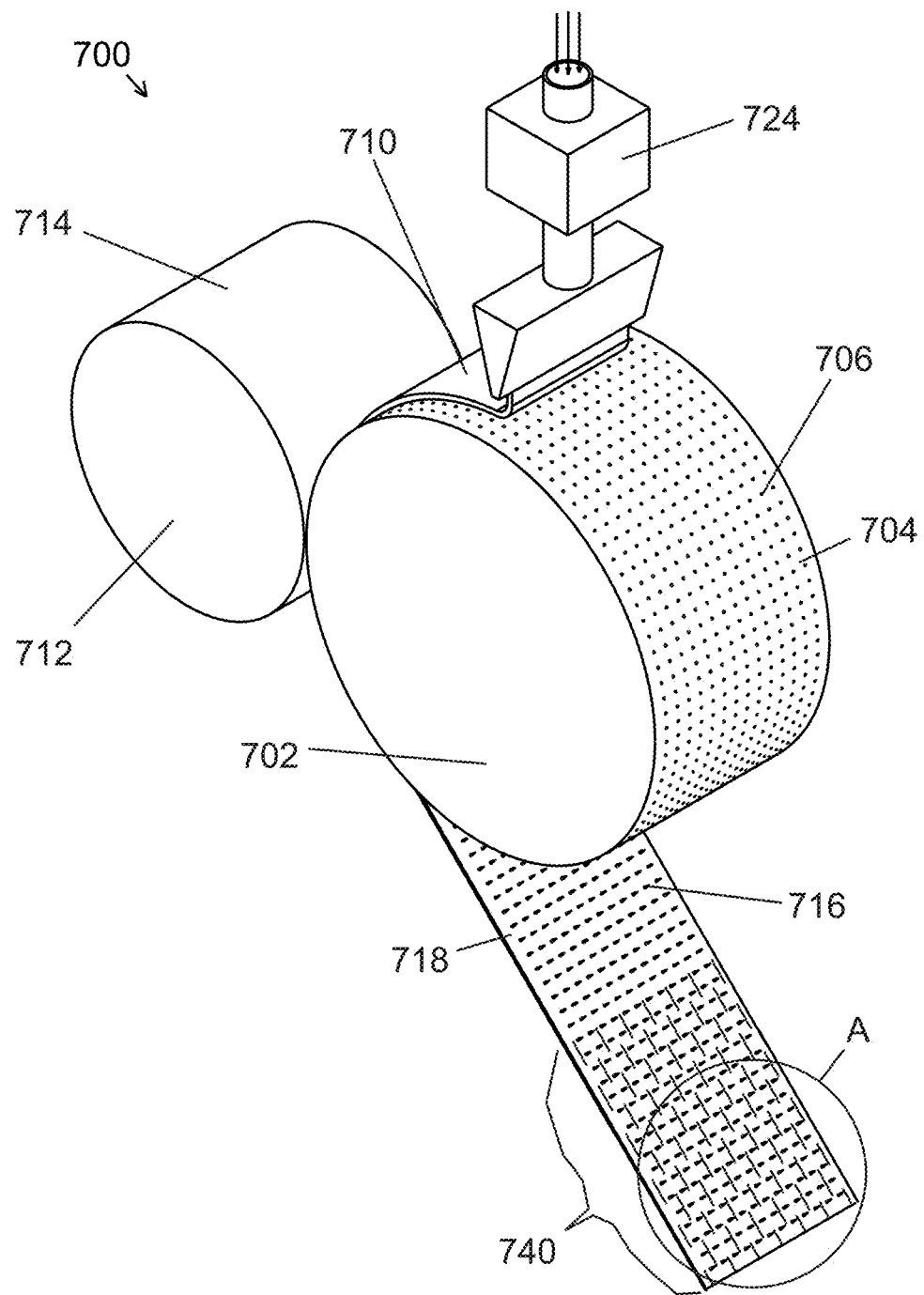
FIG. 33 is a perspective view of the system for forming elongate polymeric film of FIG. 16 modified such that the slitting action is not continuous, but rather forms a plurality of slits of predetermined length in an undivided strip of film.
Figure 34:
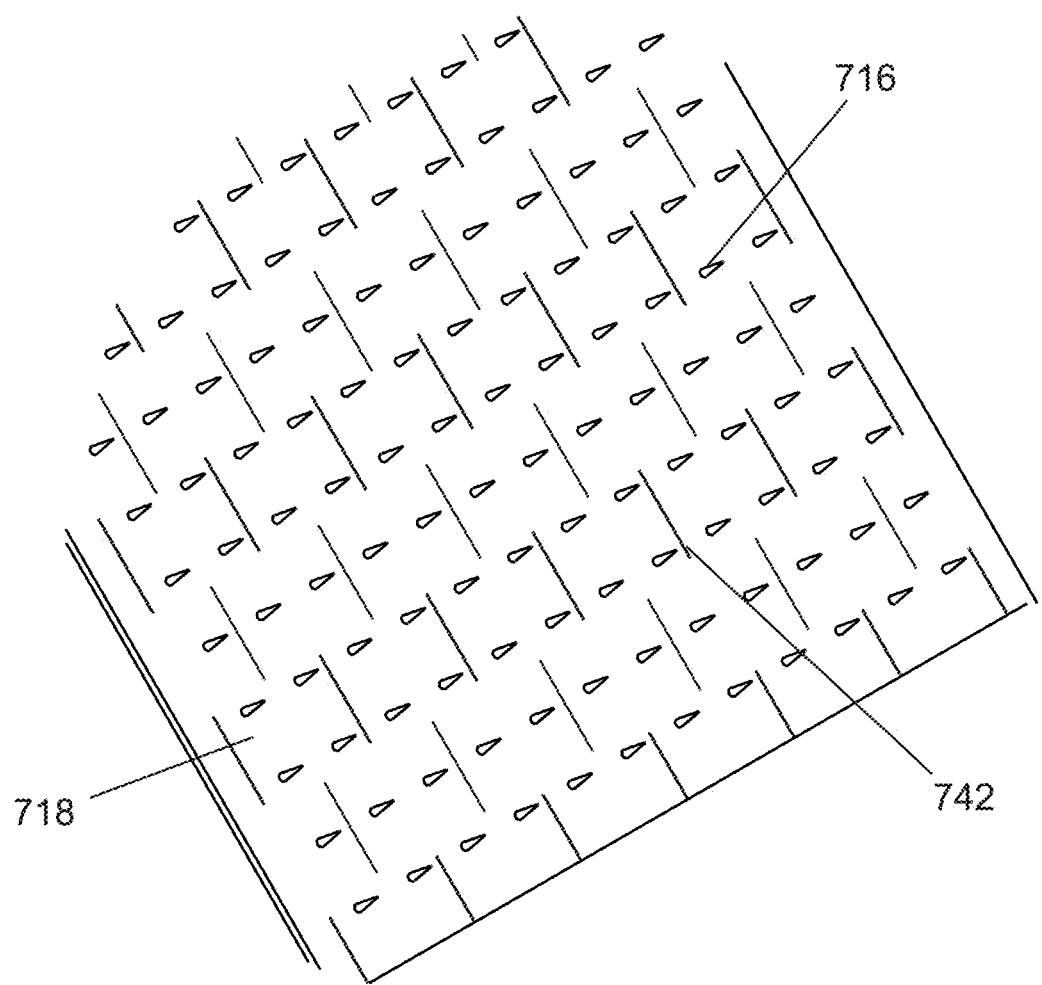
FIG. 34 is an expanded view of the objects of FIG. 33 at location A.
Figure 35:
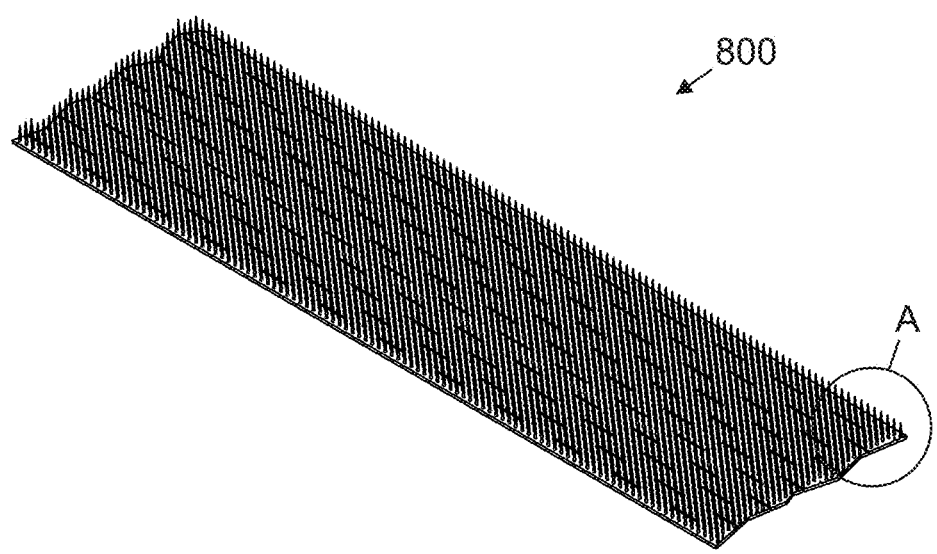
FIG. 35 is a perspective view of a film portion with nanofeatures of the present invention wherein a plurality of elongate slits are formed in the film.
Figure 36:
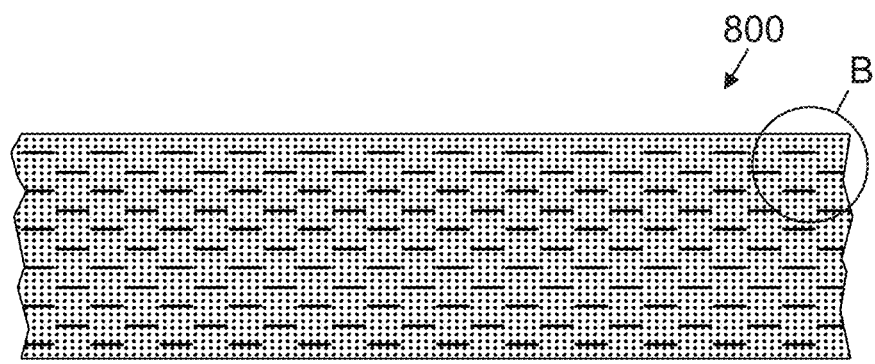
FIG. 36 is a plan view of the objects of FIG. 35.
Figure 37:
FIG. 37 is a side elevational view of the objects of FIG. 35.
Figure 38:
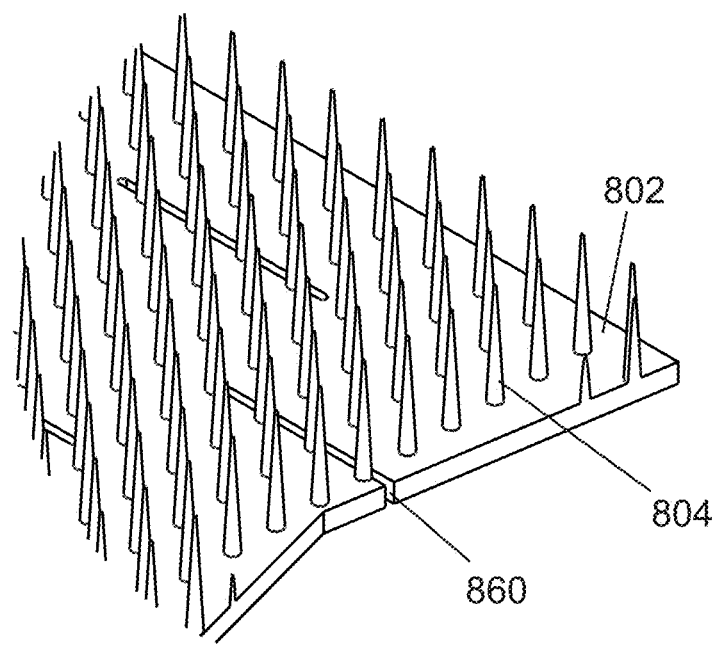
FIG. 38 is an expanded view of the objects of FIG. 35 at location A.
Figure 39:
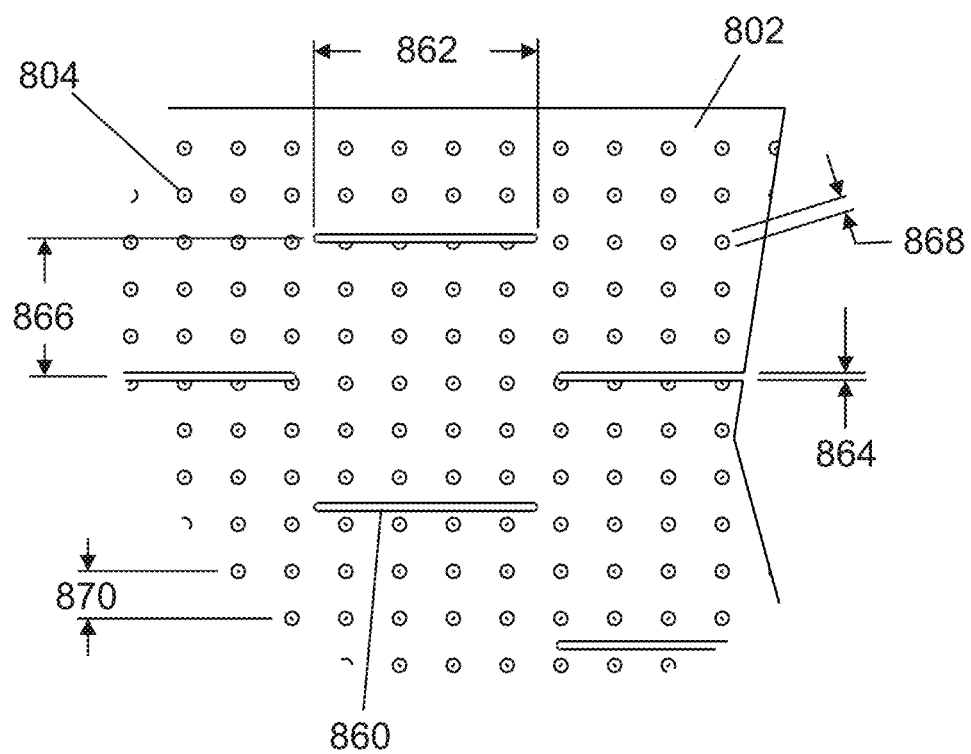
FIG. 39 is an expanded view of the objects of FIG. 36 at location B.

System 600, depicted in FIGS. 18 through 22, forms continuous longitudinal slits in film strip 318 to form a plurality of ribbons 400. In another embodiment system of the present invention depicted in FIGS. 33 and 34, longitudinal slits are formed in film strip 718, however, the slitting is intermittent rather than continuous. Strip 718 is not separated into ribbons, but rather is maintained as an integral structure with a plurality of longitudinal slots 742 formed therein. FIGS. 35 through 39 depict a portion 800 of a film strip so formed. Nanofibers 804 protrude from flexible planar portion 802 of film 800. In a preferred embodiment, diameter 866 of nanofibers 804 is between 200 and 900 nm. Space 870 between nanofibers is between 5 and 10 microns. Intermittent slitting of planar portion 802 of strip 800 deforms the material so as to produce slots 860 having a width 862 of about 50 microns. Length 862 of slots 860 is greater than 3 mm and may be optimized to suit the intended application of the material. Lateral distance 866 between slots 860 is preferably between 0.5 and 10 mm and more preferably between 1 and 5 mm.

Methods of the present invention modify the wettability of a surface on a body by forming on that surface an engineered array of nanofibers that are integral with the body and that are substantially normal to the surface at their base. The arrays have regular predetermined spacing. Any method for modifying the wettability of a surface using engineered arrays of nanofibers integral to a surface and substantially normal to that surface falls within the scope of the present invention.

Methods of the present invention for making a film material with an array of nanofibers formed on at least a portion of a surface of the film are continuous processes in which heated polymeric material is deposited onto a mold containing an array of nanoholes formed using a single femto-second laser pulse. The mold is a rotating cylinder formed of silica glass or another suitable material. The deposited material coats the surface of the mold and flows into the nanoholes. The polymeric material cools at a predetermined rate on the surface and in the nanoholes. The cooled material is stripped off of the mold/roll with the material withdrawn from the nanoholes forming an array of nanofibers the film surface. Subsequent processing steps including slitting, chopping, and weaving, among others, do not form a part of this invention. Any method for forming films/sheets of material in which heated polymer is deposited onto a rotating mold containing nanoholes, is subsequently cooled, and then stripped from the roll to produce elongate films with an array of nanofibers falls within the scope of this invention.

This description and appended claims include the words "below", "above", "side", "top", "bottom", "upper", "lower", "when", "upright", etc. to provide an orientation of embodiments of the invention to allow for proper description of example embodiments. The foregoing positional terms refer to the apparatus when in an upright orientation. A person of skill in the art will recognize that the apparatus can assume different orientations when in use. It is also contemplated that embodiments of the invention may be in orientations other than upright without departing from the spirit and scope of the invention as set forth in the appended claims. Further, it is contemplated that "above" means having an elevation greater than, and "below" means having an elevation less than such that one part need not be directly over or directly under another part to be within the scope of "above" or "below" as used herein.

The phrase "in one embodiment," as used herein does not necessarily refer to the same embodiment, although it may. Conditional language used herein, such as, among others, "can", "might", "may", "e.g.," and the like, unless specifically stated otherwise, or otherwise understood within the context as used, is generally intended to convey that certain embodiments include, while other embodiments do not include, certain features, elements and/or states.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A method for making polymeric objects having a surface on which is formed an array of nanofibers, the method comprising:
   providing a first cylindrical roll with an array of nanoholes formed in a circumferential surface thereof;
   providing a source of flowable polymer;
   rotating the first cylindrical roll;
   applying the flowable polymer to the rotating first cylindrical roll at a first angular location so that the flowable polymer coats at least a portion of the circumferential surface of the rotating first cylindrical roll and flows into at least a portion of the nanoholes;
   cooling the flowable polymer while rotating the coated first cylindrical roll to a second angular position; and
   removing the cooled polymer coated on the first cylindrical roll from the first cylindrical roll as an elongate film;
   wherein the polymer that flowed into the nanoholes forms the array of nanofibers on a surface of the elongate film.

2. The method of claim 1, wherein the first cylindrical roll is maintained at a temperature that causes the flowable polymer to solidify in the nanoholes along with a portion of the flowable polymer coating the circumferential surface of the first cylindrical roll after a predetermined angular rotation of the first cylindrical roll.

3. The method of claim 1, further comprising a second cylindrical roll with an axis parallel to the first cylindrical roll, wherein the second cylindrical roll is positioned adjacent to the first cylindrical roll such that after a predetermined angular rotation of the first cylindrical roll, the polymer coating the first cylindrical roll is compressed in a space between the circumferential surface of first cylindrical roll and a circumferential surface of the second cylindrical roll.

4. The method of claim 3, wherein the second cylindrical roll is maintained at a temperature that causes the flowable polymer to solidify in the nanoholes along with a portion of the polymer coating the circumferential surface of the first cylindrical roll after the polymer passes through the space.

\* \* \* \* \*